(12) United States Patent
Brantner

(10) Patent No.: US 11,513,505 B2
(45) Date of Patent: Nov. 29, 2022

(54) FACILITATING HUMAN INTERVENTION IN AN AUTONOMOUS DEVICE

(71) Applicant: Gerald Brantner, Palo Alto, CA (US)

(72) Inventor: Gerald Brantner, Palo Alto, CA (US)

( * ) Notice: Subject to any disclaimer, the term of this patent is extended or adjusted under 35 U.S.C. 154(b) by 0 days.

(21) Appl. No.: 17/087,921

(22) Filed: Nov. 3, 2020

(65) Prior Publication Data

US 2022/0011758 A1 Jan. 13, 2022

Related U.S. Application Data

(63) Continuation of application No. 17/080,601, filed on Oct. 26, 2020, now abandoned.

(Continued)

(51) Int. Cl.
| | |
|---|---|
| *G06Q 10/00* | (2012.01) |
| *G06Q 10/06* | (2012.01) |
| *G05B 19/418* | (2006.01) |
| *H04L 47/78* | (2022.01) |
| *H04L 67/025* | (2022.01) |
| *G08B 21/00* | (2006.01) |

(Continued)

(52) U.S. Cl.
CPC ........ *G05B 19/41875* (2013.01); *B25J 9/163* (2013.01); *B25J 9/1661* (2013.01); *B25J 9/1687* (2013.01); *G01L 5/226* (2013.01); *G01N 19/08* (2013.01); *G05B 19/4185* (2013.01); *G06Q 10/06311* (2013.01); *G06Q 10/06395* (2013.01); *G06Q 10/20* (2013.01); *G08B 21/00* (2013.01); *H04L 47/788* (2013.01); *H04L 67/025* (2013.01)

(58) Field of Classification Search
USPC .......................................................... 705/7.13
See application file for complete search history.

(56) References Cited

U.S. PATENT DOCUMENTS

| | | | | |
|---|---|---|---|---|
| 2009/0186325 | A1* | 7/2009 | Kumar | B61C 17/12 434/219 |
| 2014/0163730 | A1* | 6/2014 | Mian | B25J 9/16 700/248 |

(Continued)

OTHER PUBLICATIONS

Kruger et al., Cooperation of human and machines in assembly lines, 2009, CIRP ANnuals—Manufacturing Technology, 628-646 (Year: 2009).*

(Continued)

*Primary Examiner* — Timothy Padot
*Assistant Examiner* — Allison M Neal

(57) ABSTRACT

Methods, apparatuses, systems, and computer program products for facilitating human intervention in an autonomous device are disclosed. In a particular embodiment, a method of facilitating human intervention in an autonomous device includes a service controller selecting from a first plurality of human interventionists, by a service controller, a first set of human interventionists to respond to a request associated with an autonomous device; transmitting, by the service controller, the request to a first set of interventionist devices, each interventionist device of the first set of interventionist devices associated with a particular human interventionist in the first set of human interventionists; and receiving from the first set of interventionist devices, by the service controller, a first set of interventionist responses to the request.

20 Claims, 28 Drawing Sheets

Related U.S. Application Data

(60) Provisional application No. 63/050,004, filed on Jul. 9, 2020.

(51) Int. Cl.
*B25J 9/16*     (2006.01)
*G01N 19/08*    (2006.01)
*G01L 5/22*     (2006.01)

(56) References Cited

U.S. PATENT DOCUMENTS

| | | | | |
|---|---|---|---|---|
| 2015/0217449 A1* | 8/2015 | Meier | ............... | G05D 1/0088 |
| | | | | 901/1 |
| 2015/0235480 A1* | 8/2015 | Cudak | ............... | G05D 1/0297 |
| | | | | 701/2 |
| 2016/0334229 A1* | 11/2016 | Ross | ............... | G08G 1/161 |
| 2017/0011328 A1* | 1/2017 | Zhao | ............... | G06Q 10/06 |
| 2018/0189748 A1* | 7/2018 | Anderson | ........ | G06Q 10/06311 |
| 2019/0359424 A1* | 11/2019 | Avraham | ............ | G06Q 50/28 |
| 2021/0252699 A1* | 8/2021 | Ramani | ............... | B25J 9/1671 |

OTHER PUBLICATIONS

Rosenthal et al., Acquiring Accurate Human Responses to Robots' Questions, 2012, Springer, 117-129 (Year: 2012).*

* cited by examiner

```
┌─ Service Controller 301 ─────────────────────────────────────────────────────┐
│  ┌────────────────────────────────────────────────────────────────────────┐  │
│  │ Select From A First Plurality Of Human Interventionists, A First Set Of │  │
│  │ Human Interventionists To Respond To A Request Associated With An       │  │
│  │ Autonomous Device 302                                                   │  │
│  └────────────────────────────────────────────────────────────────────────┘  │
│                                      ⋮                                       │
│  ┌────────────────────────────────────────────────────────────────────────┐  │
│  │         Receive A Second Set Of Interventionist Responses 512           │  │
│  └────────────────────────────────────────────────────────────────────────┘  │
│  ┌────────────────────────────────────────────────────────────────────────┐  │
│  │ Determine Whether The Service Controller Is Sufficiently Confident In An│  │
│  │ Aggregate Of The First Set Of Interventionist Responses And The Second  │  │
│  │ Set Of Interventionist Response 520                                     │  │
│  └────────────────────────────────────────────────────────────────────────┘  │
│  ┌────────────────────────────────────────────────────────────────────────┐  │
│  │ In Response To Determining That The Service Controller Is Sufficiently  │  │
│  │ Confident In The Aggregate:                                             │  │
│  │   ┌──────────────────────────────────────────────────────────────────┐ │  │
│  │   │             Generate A Service Response 522                       │ │  │
│  │   └──────────────────────────────────────────────────────────────────┘ │  │
│  │   ┌──────────────────────────────────────────────────────────────────┐ │  │
│  │   │     Transmit The Service Response To The Autonomous Device 524   │ │  │
│  │   └──────────────────────────────────────────────────────────────────┘ │  │
│  └────────────────────────────────────────────────────────────────────────┘  │
│  ┌────────────────────────────────────────────────────────────────────────┐  │
│  │ In Response To Determining That The Service Controller Is Not           │  │
│  │ Sufficiently Confident In The Aggregate:                                │  │
│  │   ┌──────────────────────────────────────────────────────────────────┐ │  │
│  │   │ Select A Third Set Of Human Interventionists To Respond To The   │ │  │
│  │   │ Request 526                                                       │ │  │
│  │   └──────────────────────────────────────────────────────────────────┘ │  │
│  │   ┌──────────────────────────────────────────────────────────────────┐ │  │
│  │   │ Transmit The Request To A Third Set Of Interventionist Devices 528├─┼──┐
│  │   └──────────────────────────────────────────────────────────────────┘ │  │
│  │   ┌──────────────────────────────────────────────────────────────────┐ │  │
│  │   │      Receive A Third Set Of Interventionist Responses 530        │ │  │
│  │   └──────────────────────────────────────────────────────────────────┘ │  │
│  └────────────────────────────────────────────────────────────────────────┘  │
└──────────────────────────────────────────────────────────────────────────────┘
                                    ┌─────────────────────────┐
                                    │ Third Set Of            │
                                    │ Interventionist         │
                                    │ Devices 550             │
                                    └─────────────────────────┘
```

FIG. 5B

```
┌─────────────────────────────────────────────────────────────────────────────┐
│ Service Controller 301                                                      │
│  ┌───────────────────────────────────────────────────────────────────────┐  │
│  │ Select From A First Plurality Of Human Interventionists, A First Set   │  │
│  │ Of Human Interventionists To Respond To A Request Associated With An   │  │
│  │ Autonomous Device 302                                                  │  │
│  │                                                                        │  │
│  │   ┌──────────────────────────────────────────────────────────────┐     │  │
│  │   │ Determine, For The Request, An Expense Range And Selection   │     │  │
│  │   │ Criteria 1002                                                │     │  │
│  │   └──────────────────────────────────────────────────────────────┘     │  │
│  │                              ↓                                         │  │
│  │   ┌──────────────────────────────────────────────────────────────┐     │  │
│  │   │ For One Or More Human Interventionist Of A First Plurality   │     │  │
│  │   │ Of Human Interventions, Determine An Interventionist Expense │     │  │
│  │   │ For Each Of The One Or More Human Interventionists 1004      │     │  │
│  │   └──────────────────────────────────────────────────────────────┘     │  │
│  │                              ↓                                         │  │
│  │   ┌──────────────────────────────────────────────────────────────┐     │  │
│  │   │ Select, From The First Plurality Of Human Interventionists,  │     │  │
│  │   │ The First Set Of Human Interventionists Based On The Expense │     │  │
│  │   │ Range, The Selection Criteria, And The Interventionist       │     │  │
│  │   │ Expense Of Each Of The One Or More Human Interventionists    │     │  │
│  │   │ 1006                                                         │     │  │
│  │   └──────────────────────────────────────────────────────────────┘     │  │
│  └───────────────────────────────────────────────────────────────────────┘  │
│                                 ↓                                           │
│  ┌───────────────────────────────────────────────────────────────────────┐  │
│  │ Transmit The Request To A First Set Of Interventionist Devices 304    │  │
│  └───────────────────────────────────────────────────────────────────────┘  │
│                                 ↓                                           │
│  ┌───────────────────────────────────────────────────────────────────────┐  │
│  │ Receive From The First Set Of Interventionist Devices, A First Set Of │  │
│  │ Interventionist Responses To The Request 306                          │  │
│  └───────────────────────────────────────────────────────────────────────┘  │
└─────────────────────────────────────────────────────────────────────────────┘
```

FIG. 10

```
┌─────────────────────────────────────────────────────────────────────────────┐
│ Service Controller 301                                                      │
│  ┌────────────────────────────────────────────────────────────────────────┐ │
│  │ Select From A First Plurality Of Human Interventionists, A First Set   │ │
│  │ Of Human Interventionists To Respond To A Request Associated With An   │ │
│  │ Autonomous Device 302                                                  │ │
│  │                                                                        │ │
│  │  ┌──────────────────────────────────────────────────────────────────┐  │ │
│  │  │ Determine, For The Request, A Difficulty Rating And Selection    │  │ │
│  │  │ Criteria 1102                                                    │  │ │
│  │  └──────────────────────────────────────────────────────────────────┘  │ │
│  │                                   ▼                                    │ │
│  │  ┌──────────────────────────────────────────────────────────────────┐  │ │
│  │  │ For One Or More Human Interventionists Of The First Plurality Of │  │ │
│  │  │ Human Interventionists, Determine A Qualification Rating Of Each │  │ │
│  │  │ Of The One Or More Human Interventionists 1104                   │  │ │
│  │  └──────────────────────────────────────────────────────────────────┘  │ │
│  │                                   ▼                                    │ │
│  │  ┌──────────────────────────────────────────────────────────────────┐  │ │
│  │  │ Select, From The First Plurality Of Human Interventionists, The  │  │ │
│  │  │ First Set Of Human Interventionists Based On The Difficulty      │  │ │
│  │  │ Rating, The Selection Criteria, And The Qualification Rating Of  │  │ │
│  │  │ Each Of The One Or More Human Interventionists 1106              │  │ │
│  │  └──────────────────────────────────────────────────────────────────┘  │ │
│  └────────────────────────────────────────────────────────────────────────┘ │
│                                      ▼                                      │
│  ┌────────────────────────────────────────────────────────────────────────┐ │
│  │ Transmit The Request To A First Set Of Interventionist Devices 304     │ │
│  └────────────────────────────────────────────────────────────────────────┘ │
│                                      ▼                                      │
│  ┌────────────────────────────────────────────────────────────────────────┐ │
│  │ Receive From The First Set Of Interventionist Devices, A First Set Of  │ │
│  │ Interventionist Responses To The Request 306                           │ │
│  └────────────────────────────────────────────────────────────────────────┘ │
└─────────────────────────────────────────────────────────────────────────────┘
```

FIG. 11

```
┌─────────────────────────────────────────────────────────────────────────────┐
│ Service Controller 301                                                      │
│                                                                             │
│   ┌─────────────────────────────────────────────────────────────────────┐   │
│   │ Select From A First Plurality Of Human Interventionists, A First Set Of Human Interventionists To │   │
│   │         Respond To A Request Associated With An Autonomous Device 302                             │   │
│   │                                                                     │   │
│   │   ┌─────────────────────────────────────────────────────────────┐   │   │
│   │   │ Determine A Type Of Task To Be Performed For Responding To The Request 1502 │   │   │
│   │   └─────────────────────────────────────────────────────────────┘   │   │
│   │                              │                                      │   │
│   │                              ▼                                      │   │
│   │   ┌─────────────────────────────────────────────────────────────┐   │   │
│   │   │ Determine A Type Of Interventionist Device For Performing The Task 1504 │   │   │
│   │   └─────────────────────────────────────────────────────────────┘   │   │
│   │                              │                                      │   │
│   │                              ▼                                      │   │
│   │   ┌─────────────────────────────────────────────────────────────┐   │   │
│   │   │ Select For The First Set Of Human Interventionists, A Particular Human Interventionist │   │   │
│   │   │ Having A Particular Interventionist Device Matching The Determined Type Of │   │   │
│   │   │                     Interventionist Device 1506                │   │   │
│   │   └─────────────────────────────────────────────────────────────┘   │   │
│   └─────────────────────────────────────────────────────────────────────┘   │
│                                     │                                       │
│                                     ▼                                       │
│   ┌─────────────────────────────────────────────────────────────────────┐   │
│   │      Transmit The Request To A First Set Of Interventionist Devices 304      │   │
│   └─────────────────────────────────────────────────────────────────────┘   │
│                                     │                                       │
│                                     ▼                                       │
│   ┌─────────────────────────────────────────────────────────────────────┐   │
│   │ Receive From The First Set Of Interventionist Devices, A First Set Of Interventionist Responses │   │
│   │                          To The Request 306                            │   │
│   └─────────────────────────────────────────────────────────────────────┘   │
└─────────────────────────────────────────────────────────────────────────────┘
```

FIG. 15

```
┌─────────────────────────────────────────────────────────────────────────┐
│ Service Controller 301                                                  │
│                                                                         │
│   ┌─────────────────────────────────────────────────────────────────┐   │
│   │ Select From A First Plurality Of Human Interventionists, A First│   │
│   │ Set Of Human Interventionists To Respond To A Request           │   │
│   │ Associated With An Autonomous Device 302                        │   │
│   │                                                                 │   │
│   │   ┌─────────────────────────────────────────────────────────┐   │   │
│   │   │ Determine A Type Of Task To Be Performed For Responding │   │   │
│   │   │ To The Request 1602                                     │   │   │
│   │   └─────────────────────────────────────────────────────────┘   │   │
│   │                              ↓                                  │   │
│   │   ┌─────────────────────────────────────────────────────────┐   │   │
│   │   │ Select For The First Set Of Human Interventionists, A   │   │   │
│   │   │ Particular Human Interventionist Having A Profile       │   │   │
│   │   │ Indicating The Capability Of Performing The Type Of     │   │   │
│   │   │ Task To Be Performed For Responding To The Request 1604 │   │   │
│   │   └─────────────────────────────────────────────────────────┘   │   │
│   └─────────────────────────────────────────────────────────────────┘   │
│                                    ↓                                    │
│   ┌─────────────────────────────────────────────────────────────────┐   │
│   │ Transmit The Request To A First Set Of Interventionist Devices  │   │
│   │ 304                                                             │   │
│   └─────────────────────────────────────────────────────────────────┘   │
│                                    ↓                                    │
│   ┌─────────────────────────────────────────────────────────────────┐   │
│   │ Receive From The First Set Of Interventionist Devices, A First  │   │
│   │ Set Of Interventionist Responses To The Request 306             │   │
│   └─────────────────────────────────────────────────────────────────┘   │
└─────────────────────────────────────────────────────────────────────────┘
```

FIG. 16

Service Controller 301

For One Or More Human Interventionists Of The First Plurality Of Human Interventionists:

Transmit A Test Request To A Particular Interventionist Device Associated With A Particular Human Interventionist 1802

Receive From The Particular Interventionist Device, A Test Response To The Transmitted Test Request 1804

Based On The Test Response, Generate A Performance Metric Of The Human Interventionist 1806

Based On The Performance Metrics Of Each Of The One Or More Human Interventionists Of The First Plurality Of Human Interventionists, Determine A Rating For Each Of The One Or More Human Interventionists 1808

Select From A First Plurality Of Human Interventionists, A First Set Of Human Interventionists To Respond To A Request Associated With An Autonomous Device 302

Select, Based On The Determined Ratings, The First Set Of Human Interventionists 1810

Transmit The Request To A First Set Of Interventionist Devices 304

Receive From The First Set Of Interventionist Devices, A First Set Of Interventionist Responses To The Request 306

FIG. 18

```
┌─────────────────────────────────────────────────────────────────────────┐
│ Service Controller 301                                                  │
│                                                                         │
│  ┌───────────────────────────────────────────────────────────────────┐  │
│  │ Select From A First Plurality Of Human Interventionists, A First  │  │
│  │ Set Of Human Interventionists To Respond To A Request Associated  │  │
│  │ With An Autonomous Device 302                                     │  │
│  │                                                                   │  │
│  │   ┌───────────────────────────────────────────────────────────┐   │  │
│  │   │ Determine Whether A Particular Human Interventionist Is   │   │  │
│  │   │ Available 1920                                            │   │  │
│  │   └───────────────────────────────────────────────────────────┘   │  │
│  │                              │                                    │  │
│  │                              ▼                                    │  │
│  │   ┌───────────────────────────────────────────────────────────┐   │  │
│  │   │ In Response To Determining That The Particular Human      │   │  │
│  │   │ Interventionist Is Not Available, Exclude The Particular  │   │  │
│  │   │ Human Interventionist From The First Set Of Human         │   │  │
│  │   │ Interventionist To Response To The Request 1924           │   │  │
│  │   └───────────────────────────────────────────────────────────┘   │  │
│  │                              │                                    │  │
│  │                              ▼                                    │  │
│  │   ┌───────────────────────────────────────────────────────────┐   │  │
│  │   │ In Response To Determining That The Particular Human      │   │  │
│  │   │ Interventionist Is Available, Add The Particular Human    │   │  │
│  │   │ Interventionist From The First Set Of Human               │   │  │
│  │   │ Interventionist To Response To The Request 1926           │   │  │
│  │   └───────────────────────────────────────────────────────────┘   │  │
│  └───────────────────────────────────────────────────────────────────┘  │
│                                 │                                       │
│                                 ▼                                       │
│  ┌───────────────────────────────────────────────────────────────────┐  │
│  │ Transmit The Request To A First Set Of Interventionist Devices    │  │
│  │ 304                                                               │  │
│  └───────────────────────────────────────────────────────────────────┘  │
│                                 │                                       │
│                                 ▼                                       │
│  ┌───────────────────────────────────────────────────────────────────┐  │
│  │ Receive From The First Set Of Interventionist Devices, A First    │  │
│  │ Set Of Interventionist Responses To The Request 306               │  │
│  └───────────────────────────────────────────────────────────────────┘  │
└─────────────────────────────────────────────────────────────────────────┘
```

FIG. 19B

```
┌─────────────────────────────────────────────────────────────────────────────┐
│ Autonomous Device 2201                                                       │
│                                                                              │
│         ┌─────────────────────────────────────────────────────────┐          │
│         │   Place An Object In A Stack Of One Or More Objects 2202│          │
│         └─────────────────────────────────────────────────────────┘          │
│                                    │                                         │
│                                    ▼                                         │
│         ┌─────────────────────────────────────────────────────────┐          │
│         │ In Response To Placing The Object In The Stack, Detect  │          │
│         │              Instability In The Stack 2204              │          │
│         └─────────────────────────────────────────────────────────┘          │
│                                    │                                         │
│                                    ▼                                         │
│  ┌───────────────────────────────────────────────────────────────────┐       │
│  │ Determine That Correcting The Instability Requires A Level Of     │       │
│  │ Capability Beyond A Threshold Associated With The Autonomous      │       │
│  │                      Device 2206                                  │       │
│  └───────────────────────────────────────────────────────────────────┘       │
│                                    │                                         │
│                                    ▼                                         │
│  ┌───────────────────────────────────────────────────────────────────┐       │
│  │ In Response To Determining That Correcting The Instability        │       │
│  │ Requires The Level Of Capability Beyond The Threshold Associated  │       │
│  │ With The Autonomous Device, Generate A Request For Human          │       │
│  │                    Intervention 2208                              │       │
│  └───────────────────────────────────────────────────────────────────┘       │
└─────────────────────────────────────────────────────────────────────────────┘
```

FIG. 22

```
┌─────────────────────────────────────────────────────────────────────────────┐
│ Autonomous Device 2301                                                      │
│                                                                             │
│   ┌─────────────────────────────────────────────────────────────────────┐   │
│   │  Grasp An Object With One Or More Components Of The Autonomous Device 2302 │
│   └─────────────────────────────────────────────────────────────────────┘   │
│                                        │                                    │
│                                        ▼                                    │
│   ┌─────────────────────────────────────────────────────────────────────┐   │
│   │  Based On Sensor Input, Determine A Level Of Confidence That The Object Is Securely Grasped │
│   │  With The One Or More Components Of The Autonomous Device 2304      │   │
│   └─────────────────────────────────────────────────────────────────────┘   │
│                                        │                                    │
│                                        ▼                                    │
│   ┌─────────────────────────────────────────────────────────────────────┐   │
│   │  Determine That The Level Does Not Satisfy A Confidence Requirement 2306 │
│   └─────────────────────────────────────────────────────────────────────┘   │
│                                        │                                    │
│                                        ▼                                    │
│   ┌─────────────────────────────────────────────────────────────────────┐   │
│   │  In Response To Determining That The Level Does Not Satisfy The Confidence Requirement, │
│   │  Generate A Request For Human Intervention 2308                     │   │
│   └─────────────────────────────────────────────────────────────────────┘   │
│                                                                             │
└─────────────────────────────────────────────────────────────────────────────┘
```

FIG. 23

Service Controller 2401

Receive A Request From An Autonomous Device 2402

Generate A Service Response To The Request, The Service Response Generated Based On At Least One Of A First Set Of Interventionist Responses Received From A First Set Of Interventionist Devices Associated With A First Set Of Human Interventionists; And A First Set Of Autonomous Responses Generated By An Autonomous Module 2404

Train The Autonomous Module Using At Least One Of The First Set Of Interventionist Responses And The First Set Of Autonomous Responses 2406

FIG. 24

FACILITATING HUMAN INTERVENTION IN AN AUTONOMOUS DEVICE

CROSS-REFERENCE TO RELATED APPLICATIONS

This application is a continuation application of and claims priority from U.S. patent application Ser. No. 17/080,601, filed Oct. 26, 2020, which is a non-provisional application for patent entitled to a filing date and claiming the benefit of earlier-filed U.S. Provisional Patent Application Ser. No. 63/050,004, filed Jul. 9, 2020.

BACKGROUND

An autonomous device is a device that performs some behaviors or tasks in an autonomous manner, without requiring human control or direction. In some instances, while performing an operation in an autonomous manner, the autonomous device may determine that the internal instructions/routines/processes of the autonomous device are incapable of successfully a) executing a given task, b) identifying a next task to perform, or c) judging whether a task was successfully completed, related to both a) and b), and c) either entirely, or with a required degree of certainty or confidence.

SUMMARY

Methods, apparatuses, systems, and computer program products for facilitating human intervention in an autonomous device are disclosed. In a particular embodiment, a method of facilitating human intervention in an autonomous device includes a service controller selecting from a first plurality of human interventionists a first set of human interventionists to respond to a request associated with an autonomous device; transmitting the request to a first set of interventionist devices, each interventionist device of the first set of interventionist devices associated with a particular human interventionist in the first set of human interventionists; and receiving from the first set of interventionist devices, a first set of interventionist responses to the request.

In a particular embodiment, an apparatus for facilitating human intervention in an autonomous device includes a computer processor coupled to memory. In this embodiment, the memory includes computer program instructions that when executed by the computer processor cause the apparatus to carry out the operations of for each human interventionist of a plurality of human interventionists: transmitting, by a service controller, a test request to a particular interventionist device associated with a particular human interventionist; receiving from the particular interventionist device, by the service controller, a test response to the transmitted test request; and based on the test response, generating, by the service controller, a performance metric of the human interventionist; and based on the performance metrics of the human interventionists of the plurality of human interventionists, determining, by the service controller, a rating for each human interventionist of the plurality of human interventionists.

In a particular embodiment, a method for facilitating human intervention in an autonomous device includes the autonomous device placing an object in a stack of one or more objects; in response to placing the object in the stack, detecting instability in the stack; determining that correcting the instability requires a level of capability beyond a threshold associated with the autonomous device; and in response to determining that correcting the instability requires the level of capability beyond the threshold associated with the autonomous device, generating a request for human intervention.

In a particular embodiment, a method for facilitating human intervention in an autonomous device includes the autonomous device grasping an object with one or more components of the autonomous device; based on sensor input, determining a level of confidence that the object is securely grasped with the one or more components of the autonomous device; determining that the level does not satisfy a confidence requirement; and in response to determining that the level does not satisfy the confidence requirement, generating a request for human intervention.

In a particular embodiment, a method for facilitating human intervention in an autonomous device includes a service controller receiving a request from an autonomous device; generating a service response to the request. In this embodiment, the service response generated based on least one of: a first set of interventionist responses received from a first set of interventionist devices associated with a first set of human interventionists; and a first set of autonomous responses generated by an autonomous module. The method also includes training, by the service controller, the autonomous module using at least one of the first set of interventionist responses and the first set of autonomous responses.

BRIEF DESCRIPTION OF THE DRAWINGS

FIG. 5B sets forth a flowchart of another example method for facilitating human intervention in an autonomous device according to embodiments of the present disclosure;

FIG. 10 sets forth a flowchart of another example method for facilitating human intervention in an autonomous device according to embodiments of the present disclosure;

FIG. 11 sets forth a flowchart of another example method for facilitating human intervention in an autonomous device according to embodiments of the present disclosure;

FIG. 15 sets forth a flowchart of another example method for facilitating human intervention in an autonomous device according to embodiments of the present disclosure;

FIG. 16 sets forth a flowchart of another example method for facilitating human intervention in an autonomous device according to embodiments of the present disclosure;

FIG. 18 sets forth a flowchart of another example method for facilitating human intervention in an autonomous device according to embodiments of the present disclosure;

FIG. 19B sets forth a flowchart of another example method for facilitating human intervention in an autonomous device according to embodiments of the present disclosure;

FIG. 22 sets forth a flowchart of another example method for facilitating human intervention in an autonomous device according to embodiments of the present disclosure;

FIG. 23 sets forth a flowchart of another example method for facilitating human intervention in an autonomous device according to embodiments of the present disclosure;

FIG. 24 sets forth a flowchart of another example method for facilitating human intervention in an autonomous device according to embodiments of the present disclosure.

DETAILED DESCRIPTION

Figure 1:
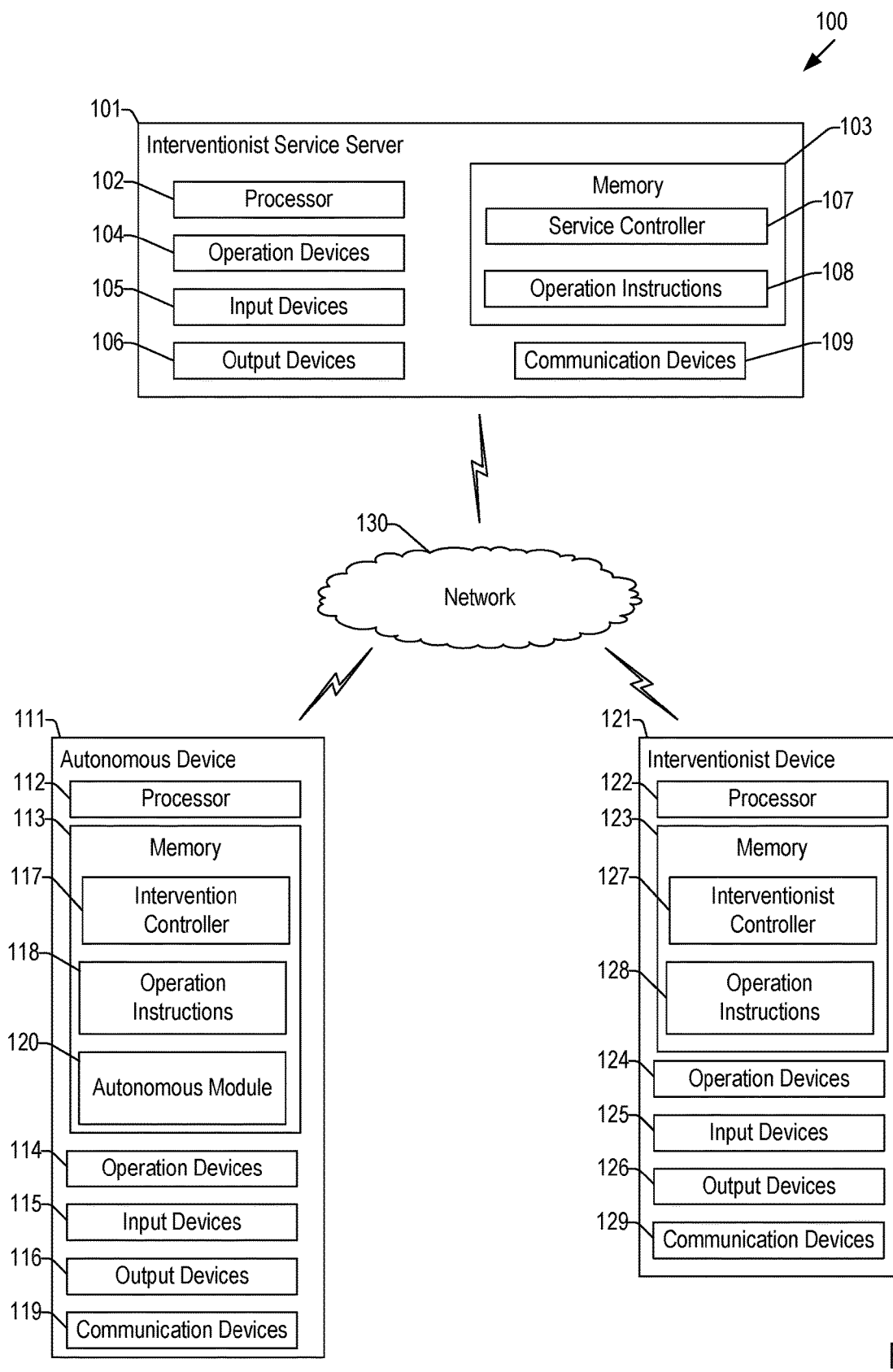
FIG. 1 sets forth a diagram of a system configured for facilitating human intervention in an autonomous device according to embodiments of the present disclosure.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Exemplary methods, apparatuses, and computer program products for facilitating human intervention in an autonomous device in accordance with the present invention are described with reference to the accompanying drawings, beginning with FIG. 1. FIG. 1 sets forth a diagram of a system (100) configured for facilitating human intervention in an autonomous device according to embodiments of the present disclosure. The system (100) of FIG. 1 includes an interventionist service server (101), an autonomous device (111), and an interventionist device (121).

The autonomous device (111) may be any type of device or machine configured for autonomous or semi-autonomous operations and facilitating human intervention according to embodiments of the present disclosure. Examples of autonomous devices include but are not limited to automobiles, air vehicles, drones, robots, and other as will occur to those of skill in the art.

In the example of FIG. 1, the autonomous device (111) includes a processor (112) coupled to a memory (113), communication devices (119), operation devices (114), input devices (115), and output devices (116). Operation devices may include circuitry, hardware, software, or any combination thereof for performing the various operations of the autonomous device. The types of operation devices of an autonomous device may be dependent upon the type of the autonomous device. For example, the operation devices of a UAV may include motors, rotors, and actuators for controlling the flight operations of the UAV. As another example, the operation devices of a manufacturing robot may include wheel controls, swivel controls, cable winding controls, and shovel controls.

The input devices (115) may include circuitry, hardware, software, or any combination thereof for capturing, receiving, or otherwise inputting information into the autonomous device. Examples of input devices include but are not limited to cameras, microphones, keyboards, keypads, touchpads, light sensors, radar, positioning circuitry, pressure sensors, fluid sensors, temperature sensors, accelerometers, wheel speed sensors, gyroscopes, altimeters, and many others as will occur to those of skill in the art.

The input devices (115) are coupled to the processor (112), such that data from the input devices may be available for use by instructions executed by the processor. For example, the input devices may include a camera that is part of a computer vision system. In this example, the camera may capture images or video to be used by the processor during performance of one or more operations, such as a landing operation, a takeoff operation, or object/collision avoidance, as non-limiting examples.

The output devices (116) may include circuitry, hardware, software, or any combination thereof for presenting, displaying, relaying, or otherwise outputting information from the autonomous device. Examples of output devices include but are not limited to display screens, speakers, tactile feedback devices, and many others as will occur to those of skill in the art. The output devices (116) are coupled to the processor (112), such that data from instructions executed by the processor may be related to the output devices.

The communication devices (119) of the autonomous device (111) may include circuitry, hardware, software, or any combination thereof for communicating with another device including, for example, transmitting and receiving data. Examples of communication devices may include but are not limited to wireless and wired devices, such as radio frequency (RF) transceivers, Bluetooth transceivers, ethernet controllers, cellular controllers, and wi-fi controllers. In the example of FIG. 1, the connection between the autonomous device (111) and the network (130) is illustrated as a wireless connection. However, readers of skill in the art will realize that the autonomous device (111) may be coupled to the network (130) or another device via a wired connection.

The memory (113) of the autonomous device (111) includes operation instructions (118) comprising computer program instructions that when executed by the processor (112) cause the processor to control the operation devices (114), the input devices (115), and the output devices (116). For example, if the autonomous device (111) is a UAV, the operation instructions may control flight control operations, such as adjusting the speed of motors and actuators. Continuing with this example, the operation instructions may also control the capturing of video from a camera input device on the UAV and relaying of the captured video via the communication device.

The memory (113) of the autonomous device (111) also includes an autonomous module (120) that includes computer program instructions that when executed by the processor (112) cause the processor (112) to perform instructions/processes/operations autonomously. For example, a robot may include instructions for maneuvering without human intervention.

In the example of FIG. 1, the memory (113) of the autonomous device (111) also includes an intervention controller (117) that includes computer program instructions for facilitating human intervention in an autonomous device. Specifically, the intervention controller (117) includes computer program instructions that when executed by the processor (112) cause the processor (112) to: generate a request in response to detecting an interrupt to an autonomous operation; transmit the request to the interventionist service server; receive a response to the request from the interventionist service server; and perform an operation in accordance with the guidance indicated in the received response.

The interventionist device (121) may be any type of device or machine configured for interfacing with a human and facilitating human intervention in an autonomous device according to embodiments of the present disclosure. Examples of interventionist devices include but are not limited to mobile devices, smartphones, tablets, laptops, computers, touch controllers, keypads, haptic devices, virtual reality (VR) headsets and systems, and others as will occur to those of skill in the art.

In the example of FIG. 1, the interventionist device (121) includes a processor (122) coupled to a memory (123), communication devices (129), operation devices (124), input devices (125), and output devices (126). Operation devices may include circuitry, hardware, software, or any combination thereof for performing the various operations of the interventionist device. The types of operation devices of an interventionist device may be dependent upon the type of the interventionist device.

The input devices (125) may include circuitry, hardware, software, or any combination thereof for capturing, receiving, or otherwise inputting information into the interventionist device. Examples of input devices include but are not limited to cameras, microphones, keyboards, keypads, touchpads, light sensors, radar, positioning circuitry, pressure sensors, fluid sensors, temperature sensors, accelerometers, wheel speed sensors, gyroscopes, altimeters, and many others as will occur to those of skill in the art.

The input devices (125) are coupled to the processor (122), such that data from the input devices may be available for use by instructions executed by the processor. For example, the input devices may include a camera that is part of a computer vision system. In this example, the camera may capture images or video to be used by the processor during performance of one or more operations, such as detecting movement of a human.

The output devices (126) may include circuitry, hardware, software, or any combination thereof for presenting, displaying, relaying, or otherwise outputting information from the interventionist device. Examples of output devices include but are not limited to display screens, speakers, tactile feedback devices, and many others as will occur to those of skill in the art. The output devices (126) are coupled to the processor (122), such that data from instructions executed by the processor may be related to the output devices.

The communication devices (129) of the interventionist device (121) may include circuitry, hardware, software, or any combination thereof for communicating with another device including, for example, transmitting and receiving data. Examples of communication devices may include but are not limited to wireless and wired devices, such as radio frequency (RF) transceivers, Bluetooth transceivers, ethernet controllers, cellular controllers, and wi-fi controllers. In the example of FIG. 1, the connection between the interventionist device (121) and the network (130) is illustrated as a wireless connection. However, readers of skill in the art will realize that the interventionist device (121) may be coupled to the network (130) or another device via a wired connection.

The memory (123) of the interventionist device (121) includes operation instructions (128) comprising computer program instructions that when executed by the processor (122) cause the processor to control the operation devices (124), the input devices (125), and the output devices (126).

In the example of FIG. 1, the memory (123) of the interventionist device (121) also includes an interventionist controller (127) that includes computer program instructions for facilitating human intervention in an autonomous device. Specifically, the interventionist controller (127) includes computer program instructions that when executed by the processor (122) cause the processor (122) to: receive a request from the interventionist service server (101); interface with a human interventionist operator including receiving input; generate a response based on the received input; and transmit the generated response to the interventionist service server (101).

The interventionist service server (101) may be any type of computer, device, or machine configured for communicating with autonomous devices and interventionist devices and facilitating human intervention in an autonomous device according to embodiments of the present disclosure. In the example of FIG. 1, the interventionist service server (101) includes a processor (102) coupled to a memory (103), communication devices (109), operation devices (104), input devices (105), and output devices (106). Operation devices may include circuitry, hardware, software, or any combination thereof for performing the various operations of the interventionist service server.

The input devices (105) may include circuitry, hardware, software, or any combination thereof for capturing, receiving, or otherwise inputting information into the interventionist service server. Examples of input devices include but are not limited to cameras, microphones, keyboards, keypads, touchpads, light sensors, radar, positioning circuitry, pressure sensors, fluid sensors, temperature sensors, accelerometers, wheel speed sensors, gyroscopes, altimeters, and many others as will occur to those of skill in the art. The input devices (105) are coupled to the processor (102), such that data from the input devices may be available for use by instructions executed by the processor.

The output devices (106) may include circuitry, hardware, software, or any combination thereof for presenting, displaying, relaying, or otherwise outputting information from the interventionist service server. Examples of output devices include but are not limited to display screens, speakers, tactile feedback devices, and many others as will occur to those of skill in the art. The output devices (106) are coupled to the processor (102), such that data from instructions executed by the processor may be related to the output devices.

The communication devices (109) of the interventionist service server (101) may include circuitry, hardware, software, or any combination thereof for communicating with another device including for example transmitting and receiving data. Examples of communication devices may include but are not limited to wireless and wired devices, such as radio frequency (RF) transceivers, Bluetooth transceivers, ethernet controllers, cellular controllers, and wi-fi controllers. In the example of FIG. 1, the connection between the interventionist service server (101) and the network (130) is illustrated as a wireless connection. However, readers of skill in the art will realize that the interventionist service server (101) may be coupled to the network (130) or another device via a wired connection.

The memory (103) of the interventionist service server (101) includes operation instructions (108) comprising computer program instructions that when executed by the processor (102) cause the interventionist service server to control the operation devices (104), the input devices (105), and the output devices (106).

In the example of FIG. 1, the memory (103) of the interventionist service server (101) also includes a service controller (107) that includes computer program instructions for facilitating human intervention in an autonomous device. Specifically, the service controller (107) includes computer program instructions that when executed by the processor (102) cause the processor (112) to: receive a request from an autonomous device; determine whether an Autonomy/AI module of the service controller can perform the request autonomously; in response to determining that the Autonomy/AI module can perform the request autonomously, provide the request to the Autonomy/AI module; and generate, by the Autonomy/AI module, an AI response.

The service controller (107) further includes computer program instructions that when executed by the processor (102) cause the processor (112) to: in response to determining that the Autonomy/AI module cannot perform the request autonomously, provide the request to an interventionist module of the service controller; select, by the interventionist module, one or more human interventionists to respond to the request; transmit, by the interventionist module, the request to one or more interventionist devices associated with the selected one or more human interventionists; and receive one or more interventionist responses from the one or more interventionist devices.

In the example of FIG. 1, the service controller (107) also includes computer program instructions that when executed by the processor (102) cause the processor (112) to: determine whether the service controller is sufficiently confident in the generated response (i.e., AI response or interventionist response); in response to determining that the service controller is not sufficiently confident in the generated response, transmit the response to the interventionist module; and in response determining that the service controller is sufficiently confident in the generated response, transmit the generated response to the autonomous device.

In a particular embodiment, the service controller (107) is configured for receiving a request from an autonomous device; determining whether the service controller can perform the request autonomously; in response to determining that the service controller cannot perform the request autonomously, selecting from a plurality of human interventionists, a first set of human interventionists to respond to the request; transmitting the request to a first set of interventionist devices associated with the selected first set of human interventionists; and receiving, from the first set of interventionist devices, a first set of interventionist responses to the transmitted request.

In a particular embodiment, the service controller (107) is configured to select from a first plurality of human interventionists a first set of human interventionists to respond to a request associated with an autonomous device; transmit the request to a first set of interventionist devices, each interventionist device of the first set of interventionist devices associated with a particular human interventionist in the first set of human interventionists; and receive from the first set of interventionist devices, a first set of interventionist responses to the request.

In a particular embodiment, the service controller is configured to for each human interventionist of a plurality of human interventionists: transmit a test request to a particular interventionist device associated with a particular human interventionist; receive from the particular interventionist device, a test response to the transmitted test request; and based on the test response, generate a performance metric of the human interventionist; and based on the performance metrics of the human interventionists of the plurality of human interventionists, determine a rating for each human interventionist of the plurality of human interventionists.

The interventionist service server (101), the autonomous device (111), and the interventionist device (121) of FIG. 1 are intended to provide respective examples of an interventionist service server, an autonomous device, and an interventionist device and are not intended to limit the configuration or components of an interventionist service server, an autonomous device, or the interventionist device that may be used in systems for facilitating human intervention in an autonomous device according to embodiments of the present disclosure. For example, in a particular embodiment, the service controller (107) may be implemented in the autonomous device (111). In another embodiment, a plurality of interventionist devices may be coupled to the service controller.

The network (130) may comprise one or more Local Area Networks (LANs), Wide Area Networks (WANs), cellular networks, satellite networks, internets, intranets, or other networks and combinations thereof. The network (130) may comprise one or more wired connections, wireless connections, or combinations thereof.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), and others as will occur to those of skill in the art. Various embodiments of the present invention may be implemented on a variety of hardware platforms in addition to those illustrated in FIG. 1.

Figure 2:
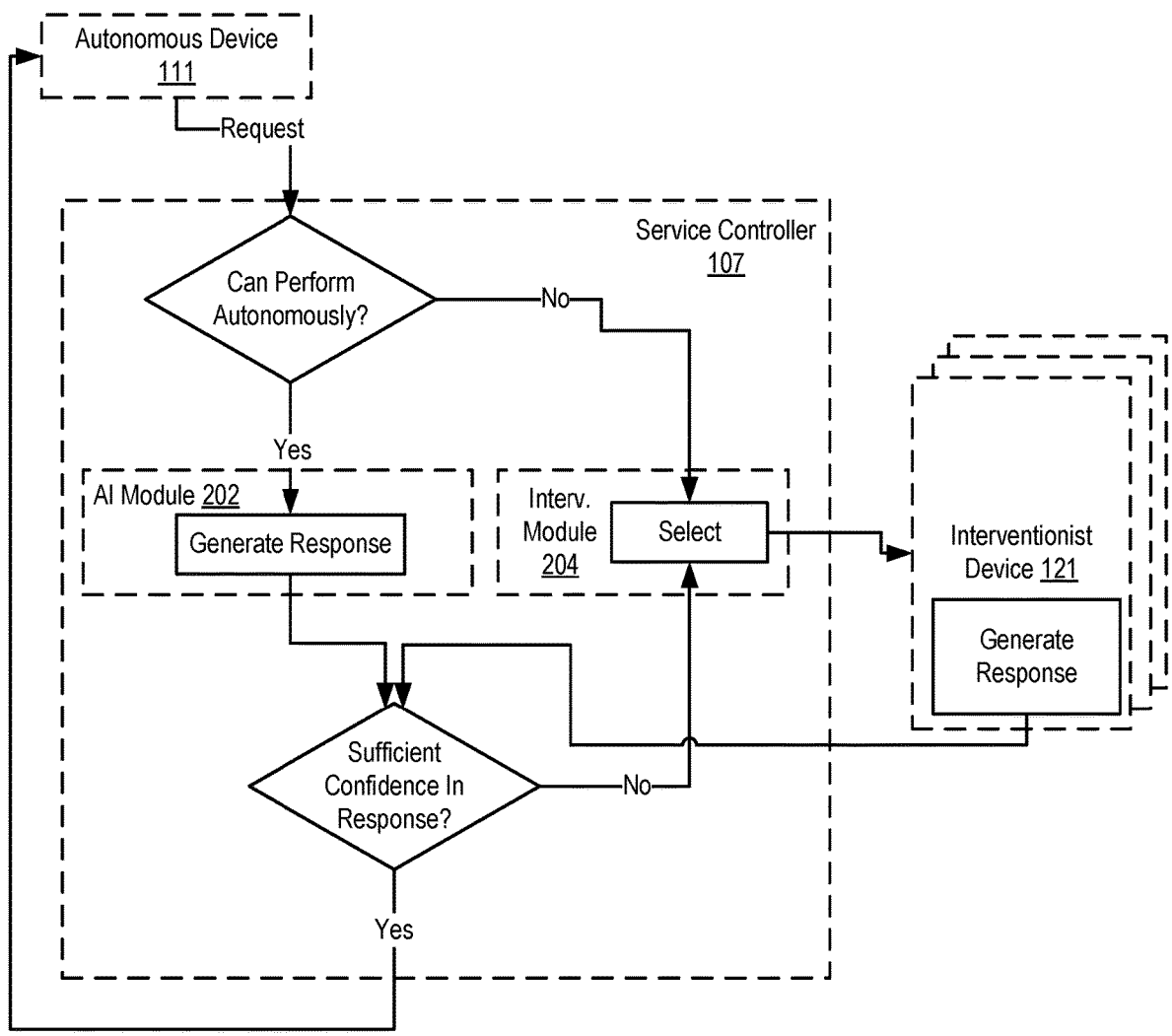
FIG. 2 sets forth a flowchart of an example method for facilitating human intervention in an autonomous device according to embodiments of the present disclosure.

For further explanation, FIG. 2 sets forth a flowchart to illustrate an implementation of a method for facilitating human intervention in an autonomous device according to embodiments of the present disclosure. The method of FIG. 2 includes receiving, by a service controller (107) of an interventionist service server (101), a request from an autonomous device (111).

In a particular embodiment, the service controller may provide to a user/client of the service, a visual programming interface, where a user/client may quickly program/assemble a Request-type. In this example, the user/client may be offered a set of interface types, which they can easily mix and match to build the request that is specific to their task. For instance, a classic robotic assembly task consists of inserting a peg in a hole. This task requires a specific sequence of interface modalities (e.g. different modalities all on a tablet). First, 'locate the peg' (where the person draws a 'loop' around the peg with a think paint-brush style pencil tool). Second, 'locate the hole' (where the person locates the hole). This is a sequence of a 'pencil' tool, followed by a pointer-tool, both associated with a written instruction, e.g. 'locate the hole'. Using these two pieces of info, the robot can complete the task autonomously.

In a particular embodiment, the autonomous device connects to an application programming interface (API) of the interventionist service server. The interventionist service server and the autonomous device may exchange data, such as coordinates. For example, the programming abstraction that is presented to customers/clients may include coordinates=getSingleLocation(object_type, image) [object_type, image are inputs from the autonomous device and sent to the human interventionist, coordinates may be what's returned].

An autonomous device operating in an autonomous mode, may send a request to an interventionist service server for guidance on performing a next step. For example, the autonomous device may be traveling along a path and encounter an obstacle that interrupts the autonomous operation of the autonomous device. In this example, the autonomous device may send a request to the interventionist service server asking for guidance.

The method of FIG. 2 includes in response to receiving the request, determining, by the service controller, whether an autonomy/AI module (202) of the service controller can perform the request autonomously. In response to determining that the autonomy/AI module (202) can perform the request autonomously, the method of FIG. 2 includes the service controller providing the request to the autonomy/AI module (202) for processing. In response to providing the autonomy/AI module (202) the request, the autonomy/AI module generates an autonomous/AI response. The autonomy/AI module may also be configured to perform general training/learning to adapt future responses based on the responses generated by the autonomy/AI module and the responses generated by the human interventionist. In a particular embodiment, the priority or weight applied to the generated responses in the learning process may be based on various factors including but not limited to the qualifications of the selected human interventionist; the type of the interventionist device; and the urgency of the request.

In response to determining that the autonomy/AI module (202) cannot perform the request autonomously, the method of FIG. 2 includes the service controller providing the request to an interventionist module (204). The method of FIG. 2 also includes the interventionist module (204) in response to receiving the request, selecting one or more human interventionists to process the request. Selecting one or more human interventionists may be carried out by selecting, from a plurality of human interventionists having associated interventionist devices, a set of human interventionists based on the qualifications of the human interventionists; costs of using the human interventionists; availability of the human interventionists; urgency of the request; type of interventionist devices associated with the human interventionists; and quality, speed, bandwidth of the connection to the various interventionist device. In a particular embodiment, the service controller is configured to receive an updated request. In this case, the service controller's interventionist module may change a selection of the human interventionist based on the data in the updated request.

In a particular embodiment, human interventionists are benchmarked/ranked against other humans and/or the autonomy/AI module, with respect to different request types and interfaces. The benchmarking or rating information may be used to match higher-priority requests (in terms of speed or accuracy) to higher-performing interventionists (in terms of speed or accuracy). Similarly, autonomous devices of clients with a higher budget may be coupled to higher-performing interventionists.

In order to accomplish low-latency (short turnaround) human intervention, the service controller may utilize statistical methods (based on historical data and extrapolation from which) to a) predict person's response time (by task/interface type) and b) connectivity (latency/bandwidth) of the internet connection between the autonomous device and the human interventionist. Combining a and b, the service controller may optimize for rank latency. Requests may be ranked by urgency and assigned to a human interventionist accordingly.

In order to judge whether a human interventionist is readily available to respond to a request, the service controller may read the sensors of the interventionist device associated with the human interventionist and assess if the interventionist device is actively being used or accessible by the interventionist (e.g., in the interventionist's hand). Alternatively, the service controller can determine whether the person is online by having him/her operate on simulated data.

The method of FIG. 2 includes the interventionist module (204) transmitting the request to an interventionist device (121) associated with the selected human interventionist. In response to receiving the request, the interventionist device presents the request to the human interventionist. The method of FIG. 2 also includes the interventionist device receiving input from the human interventionist in response to representing the request. In the method of FIG. 2, the interventionist device generates and provides to the service controller, based on the received input, an interventionist response to the request. For example, in the case where an autonomous device is traveling along a path and is stuck when it encounters an obstacle, a human interventionist may use the interface of the interventionist device to provide a solution. In this example, the solution may be providing coordinates for traveling around the obstacle.

The method of FIG. 2 includes the service controller (107) determining whether the service controller has sufficient confidence in a generated response (i.e., the autonomous/AI response and the interventionist response). Certain interventions (perhaps for human-safety critical tasks) may require high accuracy/confidence. In order to increase confidence, the service controller may distribute a single request to multiple human interventionists. Using statistical methods, the service controller may return intervention data with higher confidence, together with a statistical metric for this confidence (e.g. with 95% confidence, the true object location lies within the selected circle/sphere).

In response to determining that the service controller (107) does not have sufficient confidence in the generated response, the service controller sends an instruction to the interventionist module (204) to select one or more human interventionists. If the interventionist module had selected a first set of interventionists to respond to the request, the interventionist module may select another set of interventionists to respond to the request.

In response to determining that the service controller (107) does have sufficient confidence in the generated response, the service controller transmits the generated response (i.e., the autonomous/AI response or the interventionist response) to the autonomous device (111).

The method of FIG. 2 also includes the autonomous device (111) receiving the generated response. In response to receiving the generated response, the autonomous device (111) performs an operation in accordance with the generated response. For example, a human interventionist may generate a response that points out the landing spot of an aerial drone by clicking on a table interventionist device. As another example, a shopping-isle scanning robot issues pictures to a human interventionist via the interventionist service server and the interventionist visually assesses fill-states (e.g. 60% full) through an interface on a smart phone interventionist device. As another example, a human operator, through a game pad interventionist device interface, frees a ground delivery drone that is stuck at an obstacle.

Figure 3:
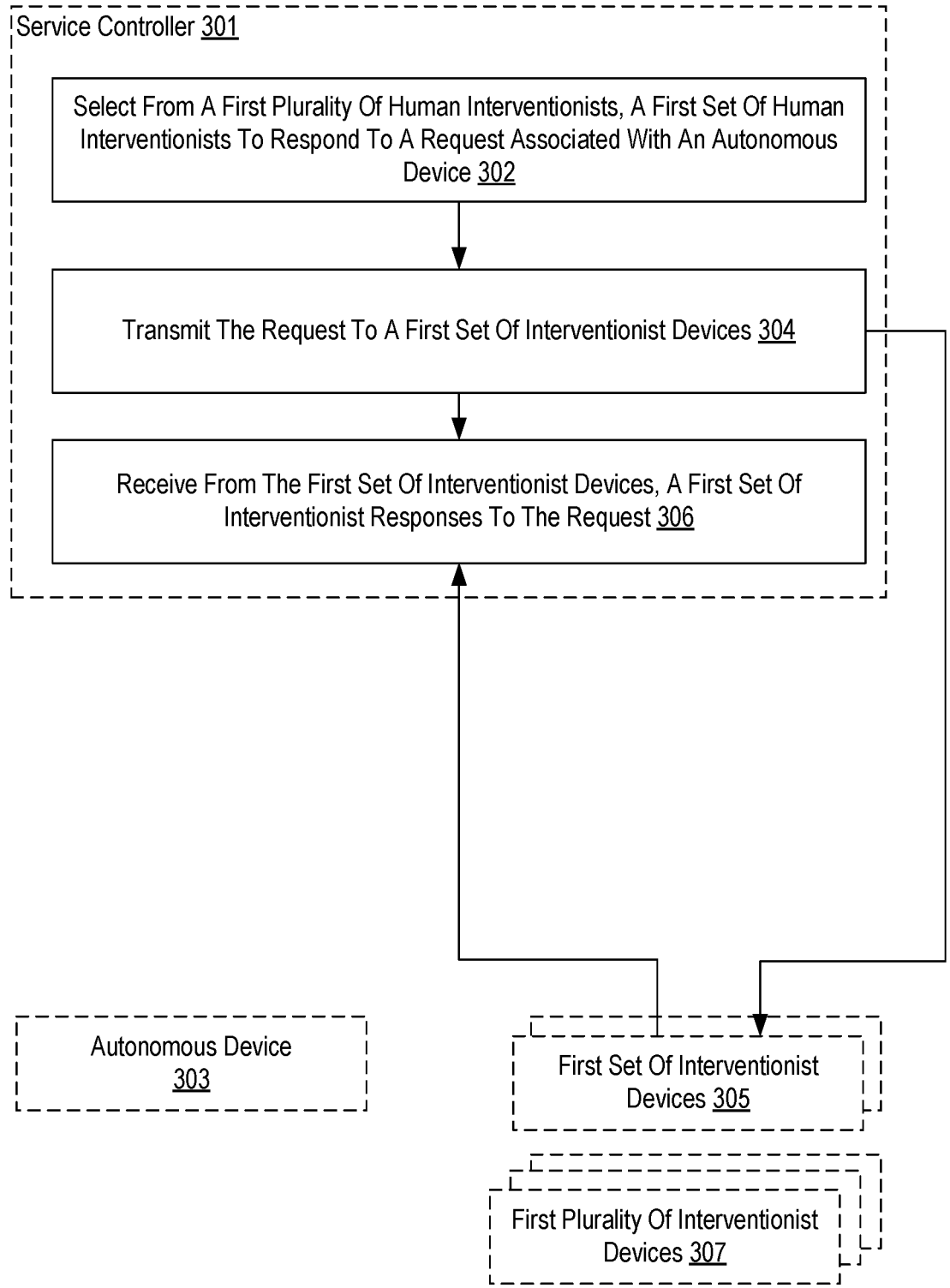
FIG. 3 sets forth a flowchart of another example method for facilitating human intervention in an autonomous device according to embodiments of the present disclosure.

For further explanation, FIG. 3 sets forth a flow chart illustrating an exemplary method for facilitating human intervention in an autonomous device according to embodiments of the present disclosure. The method of FIG. 3 includes selecting (302) from a first plurality of human interventionists, by a service controller (301), a first set of human interventionists to respond to a request associated with an autonomous device (303). A service controller is circuitry, hardware, software, or some combination thereof for facilitating human intervention. In a particular embodiment, the service controller (301) is an example of the service controller (107) of FIG. 1. As explained above, a service controller may be located on a server or device that is remote from the autonomous device or alternatively, may be located within the autonomous device. A request may be a message from the autonomous device that specifies information regarding the autonomous device. In a particular embodiment, a request is generated by the service controller based on information received from the autonomous device. Examples of the types of information that the request may include but are not limited to: an operational status of the autonomous device (e.g., on/off; stuck message; error message; alarm codes/messages; damaged equipment; etc.), an instruction/routine/process indication (e.g., right movement loop), a last step/operation/task/behavior performed (e.g., turned left; shutdown rotor), a plurality of decision choices (e.g., menu choices—identify objects as (a), (b), or (c)), a type of behavior/task that is required to perform (e.g., provide coordinates; guide robot movement), urgency indication (e.g. respond to five minutes), criteria for selecting a human interventionist (e.g., need a doctor; need a mechanic; need a level 8 technician; need lowest cost, available technician that can do level 7 operation on robot); and others as will occur to those of skill in the art after reading the subject disclosure.

Selecting (302) from a first plurality of human interventionists, by a service controller (301), a first set of human interventionists to respond to a request associated with an autonomous device (303) may be carried out by identifying another set of human interventionists that best satisfy the selection criteria that is specified by the service controller or the request. A set of human interventionists may include one or more human interventionists. A human interventionist is a human person that operates an interventionist device. As will be explained below, the selection criteria may include one or more metrics, conditions, or requirements. Examples of the type of data in a selection criteria may include but are not limited to: requirements of the request, such as urgency, priority, difficulty, expense range; and the profiles of the human interventionists which may include information, such as type of interventionist devices associated with the interventionists and ratings of the interventionists according to various metrics, such as performance metrics, qualification, expense, and availability.

The method of FIG. 3 also includes transmitting (304), by the service controller (301), the request to a first set (305) of interventionist devices, where each interventionist device of the first set of interventionist devices is associated with a particular human interventionist in the first set of human interventionists. Transmitting (304), by the service controller (301), the request to a first set (305) of interventionist devices may be carried out by modifying the request by reformatting, adding data, or removing data from the request; and sending the request via a wireless or wired communication network or connection to the interventionist device. For example, the request may be transmitted via an API, as an email, a text message, a link to a network location, and any other electronic means of relaying information from one device to another device.

The method of FIG. 3 also includes receiving (306) from the first set (305) of interventionist devices, by the service controller (301), a first set of interventionist responses to the request. Receiving (306) from the first set (305) of interventionist devices, by the service controller (301), a first set of interventionist responses to the request may be carried out by receiving data via a wireless or wired communication network or connection to the interventionist device.

As explained above, an autonomous device may be a device that performs some behaviors or tasks in an autonomous manner, without requiring human control or direction. While the autonomous device may perform an operation in an autonomous manner, the autonomous device may determine that the instructions/routines/processes of the autonomous device are incapable of identifying a next task to perform with a required degree of certainty or confidence. In this example, the autonomous device may transmit a request for help from a service controller (e.g., the service controller (107) of the interventionist service server (101) of FIG. 1). The service controller may include instructions/routines/processes that can identify autonomously a next task to perform with the required degree of certainty or confidence. In some situations, the service controller may determine that the instructions/routines/processes cannot autonomously identify the next task to perform. In response to determining that the service controller cannot identify the next task to perform, the service controller may select a human interventionist for performing the request of the autonomous device.

In a particular embodiment, the service controller may not include an AI or autonomous module with instructions/routines/processes for autonomously identifying the next task to perform. Without an AI or autonomous module to identify the next task to perform, the service controller may be configured to select one or more human interventionists for performing the request of the autonomous device.

Figure 4:
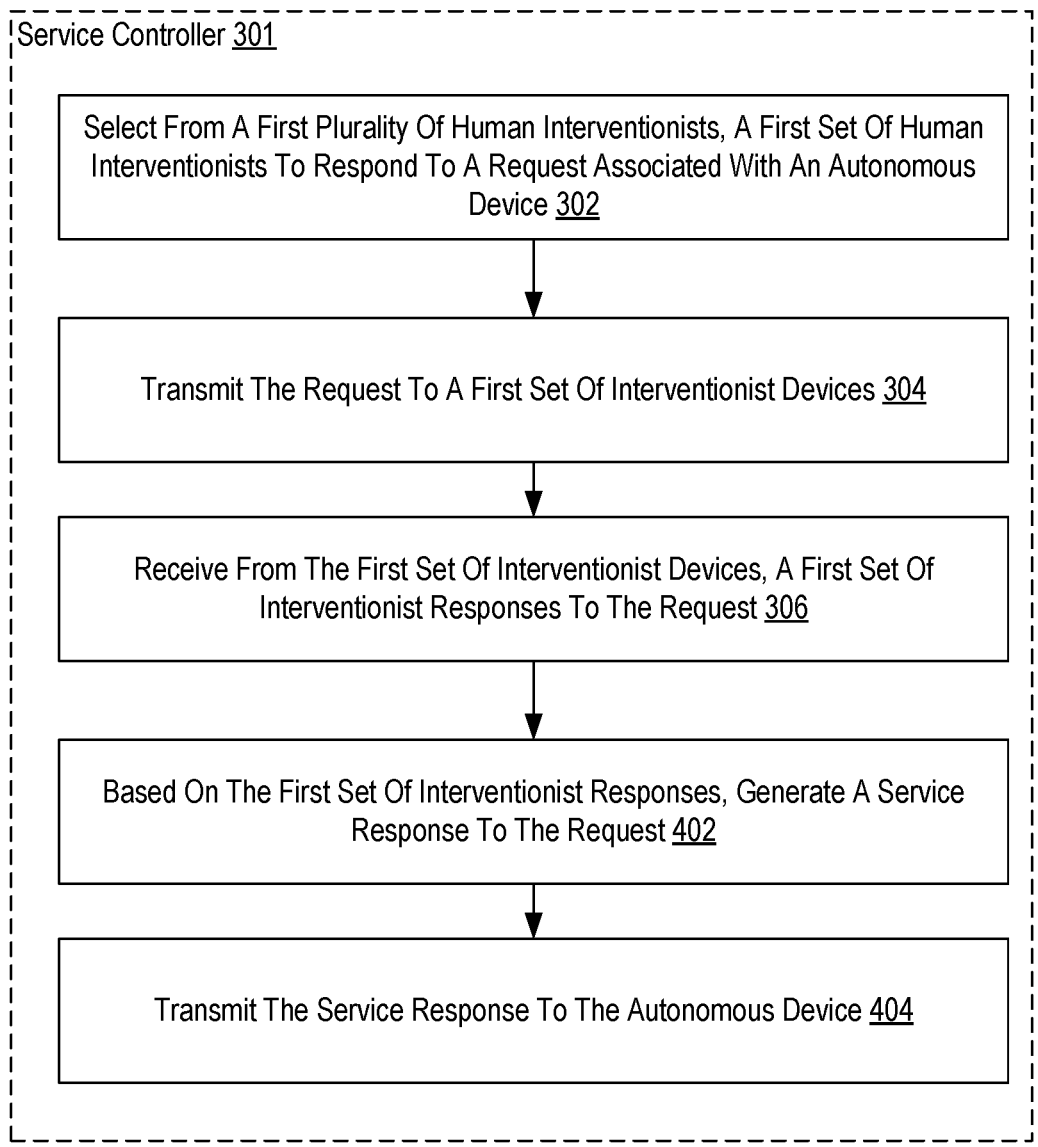
FIG. 4 sets forth a flowchart of another example method for facilitating human intervention in an autonomous device according to embodiments of the present disclosure.

For further explanation, FIG. 4 sets forth a flow chart illustrating an exemplary method for facilitating human intervention in an autonomous device according to embodiments of the present disclosure. The method of FIG. 4 is similar to the method of FIG. 3 in that the method of FIG. 4 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, the method of FIG. 4 includes based on the first set of interventionist responses, generating (402), by the service controller (301), a service response to the request. Generating (402) based on the first set of interventionist responses, by the service controller (301), a service response to the request may be carried out by using the first set of responses to create the service response; averaging the responses; and modifying the responses by reformatting, adding data, or removing data from the response. For example, a set of twelve responses may include ten responses indicating a first selection and two responses indicating a second selection. In this example, the service controller may use the majority response of the first selection as the service response.

In addition, the method of FIG. 4 also includes transmitting (404), by the service controller (301), the service response to the autonomous device (303). Transmitting (404), by the service controller (301), the service response to the autonomous device (303) may be carried out by sending the response via a wireless or wired communication network or connection to the autonomous device. For example, the request may be transmitted via an API, as an email, a text message, a link to a network location, and any other electronic means of relaying information from one device to another device.

Figure 5A:
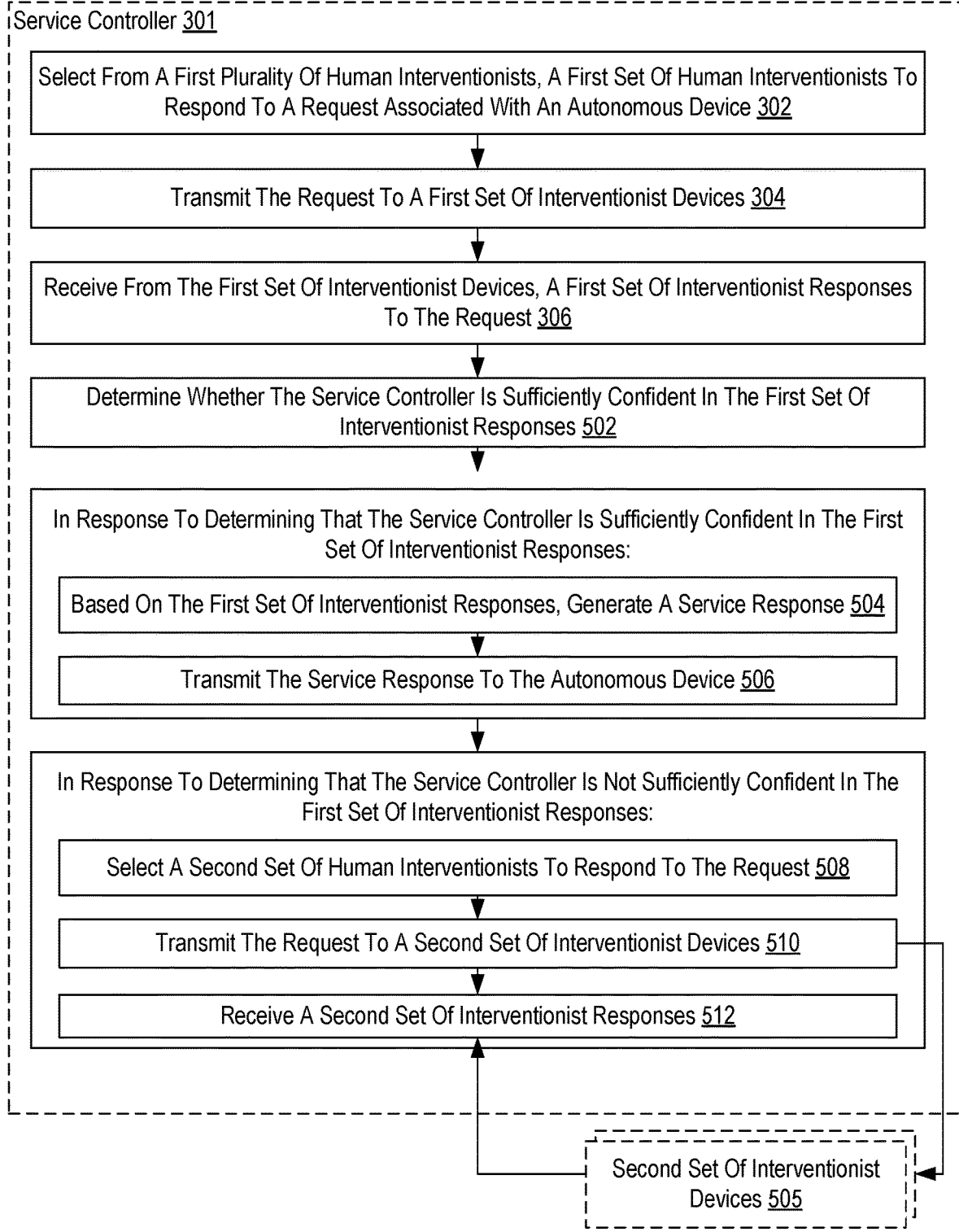
FIG. 5A sets forth a flowchart of another example method for facilitating human intervention in an autonomous device according to embodiments of the present disclosure.

For further explanation, FIG. 5A sets forth a flow chart illustrating an exemplary method for facilitating human intervention in an autonomous device according to embodiments of the present disclosure. The method of FIG. 5A is similar to the method of FIG. 3 in that the method of FIG. 5A also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, the method of FIG. 5A includes determining (502), by the service controller (301), whether the service controller (301) is sufficiently confident in the first set of interventionist responses. Determining (502), by the service controller (301), whether the service controller (301) is sufficiently confident in the first set of interventionist responses may be carried out by determining the confidence threshold requirement associated with the request; and determining whether the first set of human interventionist responses exceeds the confidence threshold. For example, certain interventions (perhaps for human-safety critical tasks) may require high accuracy/confidence. In order to increase confidence, the service controller may distribute a single request to multiple human interventionists. Using statistical methods, the service controller may return intervention data with higher confidence, together with a statistical metric for this confidence (e.g. with 95% confidence, the true object location lies within the selected circle/sphere). However, the returned set of responses may not satisfy the confidence threshold. For example, a confidence threshold may require all responses in the set of responses to indicate the same selection/value/data. Continuing with this example, if two out of twelve interventionist responses indicate a different response, the confidence threshold may be exceeded.

The method of FIG. 5A also includes in response to determining that the service controller (301) is sufficiently confident in the first set of interventionist responses, generating (504), by the service controller (301), a service response to the request. Generating (504), by the service controller (301), a service response to the request may be carried out by using the first set of responses to create the service response, averaging the responses, and modifying the responses by reformatting, adding data, or removing data from the responses to form the service response.

The method of FIG. 5A also includes in response to determining that the service controller (301) is sufficiently confident in the first set of interventionist responses, transmitting (506), by the service controller (301), the first set of interventionist responses to the autonomous device (303). Transmitting (506), by the service controller (301), the first set of interventionist responses to the autonomous device (305) may be carried out by modifying the first set of responses by reformatting, adding data, or removing data from the responses; and sending the service response via a wireless or wired communication network or connection to the autonomous device. For example, the request may be transmitted via an API, as an email, a text message, a link to a network location, and any other electronic means of relaying information from one device to another device.

The method of FIG. 5A also includes in response to determining that the service controller (301) is not sufficiently confident in the first set of interventionist responses: selecting (508) from a second set of human interventionists, by the service controller (301), a second set of human interventionists to respond to the request. In a particular embodiment, the second plurality of human interventionists may include one or more of the human interventionists of the first plurality of human interventionists. However, in a particular embodiment, the second plurality of human interventionists may include a completely different collection of human interventionists. Likewise, the second set of human interventionists may be the same as the first set, completely different from the first set, or include some but not all of the human interventionists of the first set. Selecting (508), by the service controller (301), a second set of human interventionists to respond to the request may be carried out by identifying another set of human interventionists that best satisfy the selection criteria that is specified by the service controller or the request. As will be explained below, the selection criteria may include one or more metrics, conditions, or requirements. Examples of the type of input for a selection criteria may include but are not limited to: requirements of the request, such as urgency, priority, difficulty, expense range; and the profiles of the human interventionists, which may include information such as the types of interventionist devices associated with the interventionists and ratings of the interventionists according to various metrics, such as qualification, expense, availability, responsiveness, and accuracy.

The method of FIG. 5A further includes in response to determining that the service controller (301) is not sufficiently confident in the first set of interventionist responses: transmitting (510), by the service controller (301), the request to a second set of interventionist devices (505), each interventionist device of the second set of interventionist devices associated with a particular human interventionist in the second set of human interventionists. Transmitting (510), by the service controller (301), the request to a second set of interventionist devices (505) associated with the selected set of second human interventionists may be carried out by modifying the request by reformatting, adding data, or removing data from the request; and sending the response via a wireless or wired communication network or connection to the interventionist device. For example, the request may be transmitted via an API, as an email, a text message, a link to a network location, and any other electronic means of relaying information from one device to another device.

In addition, the method of FIG. 5A also includes in response to determining that the service controller (301) is not sufficiently confident in the first interventionist response: receiving (512), by the service controller (301), a second set of interventionist responses from the second set of interventionist devices (505). Receiving (512), by the service controller (301), a second set of interventionist responses from the second set of interventionist devices (505) may be carried out by receiving data via a wireless or wired communication network or connection to the interventionist device.

For further explanation, FIG. 5B sets forth a flow chart illustrating an exemplary method for facilitating human intervention in an autonomous device according to embodiments of the present disclosure. The method of FIG. 5B is similar to the method of FIG. 5A in that the method of FIG. 5B also includes: selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

As in the method of FIG. 5A, the method of FIG. 5B also includes in response to determining that the service controller (301) is sufficiently confident in the first set of interventionist responses, transmitting (506), by the service controller (301), the first set of interventionist responses to the autonomous device (303); and in response to determining that the service controller (301) is not sufficiently confident in the first set of interventionist responses: selecting (508) from a second set of human interventionists, by the service controller (301), a second set of human interventionists to respond to the request; transmitting (510), by the service controller (301), the request to a second set of interventionist devices (505), each interventionist device of the second set of interventionist devices associated with a particular human interventionist in the second set of human interventionists; receiving (512), by the service controller (301), a second set of interventionist responses from the second set of interventionist devices (505).

However, unlike the method of FIG. 5A, the method of FIG. 5B includes determining (520), by the service controller (301), whether the service controller is sufficiently confident in an aggregate of the first set of interventionist responses and the second set of interventionist responses. Determining (520), by the service controller (301), whether the service controller is sufficiently confident in an aggregate of the first set of interventionist responses and the second set of interventionist responses may be carried out by determining the confidence threshold requirement associated with the request; and determining whether the aggregate of the first set of human interventionist responses and the second set of human interventionist responses exceeds the confidence threshold. For example, certain interventions (perhaps for human-safety critical tasks) may require high accuracy/confidence. In order to increase confidence, the service controller may distribute a single request to multiple human interventionists. Using statistical methods, the service controller may return intervention data with higher confidence, together with a statistical metric for this confidence (e.g. with 95% confidence, the true object location lies within the selected circle/sphere). However, the returned set of responses may not satisfy the confidence threshold. For example, a confidence threshold may require all responses in the set of responses to indicate the same selection/value/data. Continuing with this example, if two out of twelve interventionist responses indicate a different response, the confidence threshold may be exceeded.

The method of FIG. 5B also includes in response to determining that the service controller is sufficiently confident in the aggregate of the first set of interventionist responses and the second set of interventionist responses: based on the aggregate of the first set of interventionist responses and the second set of interventionist responses, generating (522), by the service controller (301), a service response to the request. Generating (522), by the service controller (301), a service response to the request may be carried out by using the first set of responses and the second set of responses to create the service response, averaging the responses, and modifying the responses by reformatting, adding data, or removing data from the responses to form the service response. For example, the most common response may be selected as the basis for the service response. In another example, the average of the responses may be selected as the basis for the service response.

In addition, the method of FIG. 5B also includes in response to determining that the service controller is sufficiently confident in the aggregate of the first set of interventionist responses and the second set of interventionist responses: transmitting (524), by the service controller (301), the service response to the autonomous device. Transmitting (524), by the service controller (301), the service response to the autonomous device may be carried out by modifying the first set and the second set of responses by reformatting, adding data, or removing data from the responses; and sending the service response via a wireless or wired communication network or connection to the autonomous device. For example, the request may be transmitted via an API, as an email, a text message, a link to a network location, and any other electronic means of relaying information from one device to another device.

The method of FIG. 5B also includes in response to determining that the service controller is not sufficiently confident in the aggregate of the first set of interventionist responses and the second set of interventionist responses: selecting (526) from a third plurality of human interventionists, by the service controller (301), a third set of human interventionists to respond to the request. In a particular embodiment, the third plurality of human interventionists may include one or more of the human interventionists of the first/second plurality of human interventionists. However, in a particular embodiment, the third plurality of human interventionists may include a completely different collection of human interventionists. Likewise, the third set of human interventionists may be the same as the first/second set, completely different from the first/second set, or include some but not all of the human interventionists of the first/second set. Selecting (526) from a third plurality of human interventionists, by the service controller (301), a third set of human interventionists to respond to the request may be carried out by identifying another set of human interventionists that best satisfy the selection criteria that is specified by the service controller or the request. As will be explained below, the selection criteria may include one or more metrics, conditions, or requirements. Examples of the type of input for a selection criteria may include but are not limited to: requirements of the request, such as urgency, priority, difficulty, expense range; and the profiles of the human interventionists, which may include information such as the types of interventionist devices associated with the interventionists and ratings of the interventionists according to various metrics, such as qualification, expense, availability, responsiveness, and accuracy.

In addition, the method of FIG. 5B also includes in response to determining that the service controller is not sufficiently confident in the autonomous response: transmitting (528), by the service controller (301), the request to a third set of interventionist devices (550), each interventionist device of the third set of interventionist devices associated with a particular human interventionist in the third set of human interventionists. Transmitting (528), by the service controller (301), the request to a third set of interventionist devices, each interventionist device of the third set of interventionist devices associated with a particular human interventionist in the third set of human interventionists may be carried out by modifying the request by reformatting, adding data, or removing data from the request; and sending the response via a wireless or wired communication network or connection to the interventionist device. For example, the request may be transmitted via an API, as an email, a text message, a link to a network location, and any other electronic means of relaying information from one device to another device.

Finally, the method of FIG. 5B also includes in response to determining that the service controller is not sufficiently confident in the autonomous response: receiving (530), by the service controller (301), a third set of interventionist responses from the third set of interventionist devices. Receiving (530), by the service controller (301), a third set of interventionist responses from the third set of interventionist devices may be carried out by receiving data via a wireless or wired communication network or connection to the interventionist device.

Figure 6:
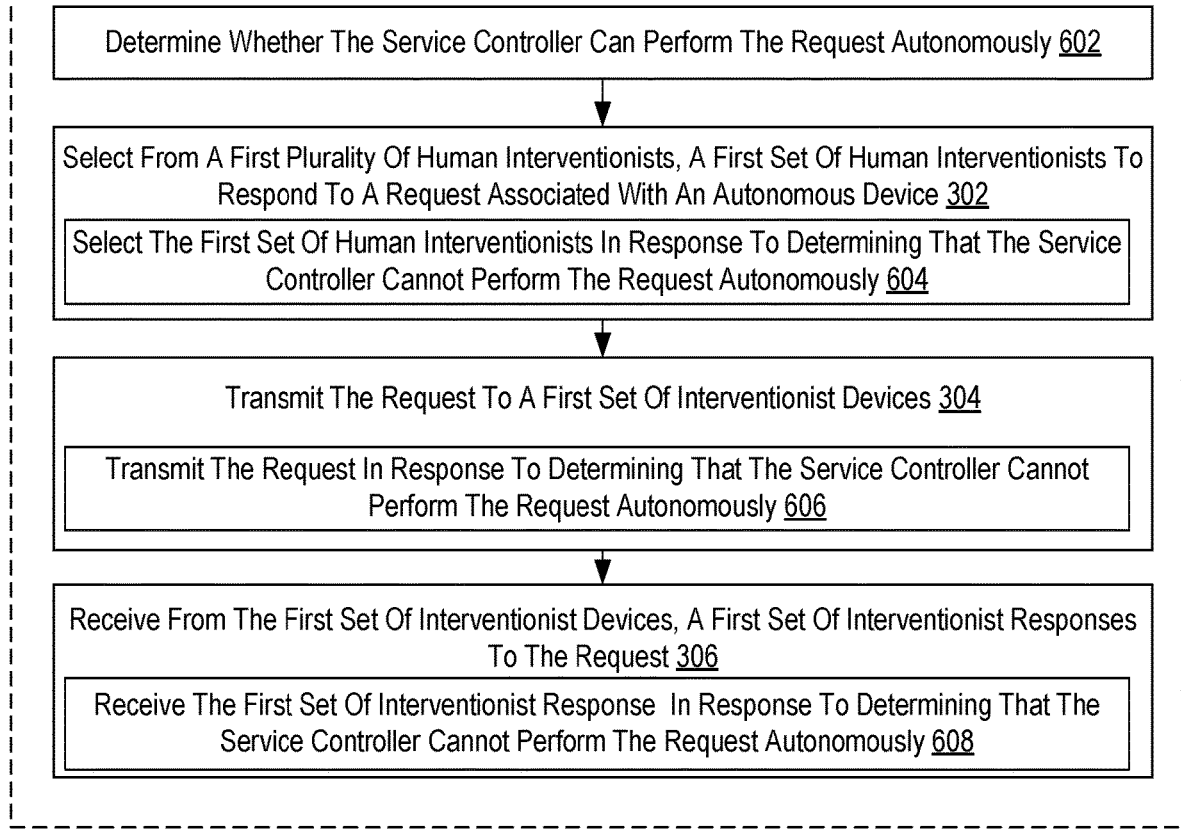
FIG. 6 sets forth a flowchart of another example method for facilitating human intervention in an autonomous device according to embodiments of the present disclosure.

For further explanation, FIG. 6 sets forth a flow chart illustrating an exemplary method for facilitating human intervention in an autonomous device according to embodiments of the present disclosure. The method of FIG. 6 is similar to the method of FIG. 3 in that the method of FIG. 6 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, the method of FIG. 6 includes determining (602), by the service controller (301), whether the service controller (301) can perform the request autonomously. Performing the request autonomously may include deciding a particular action to perform based only on instructions executing on the autonomous device. That is, in this particular example, performing an action autonomously may be carried out without receiving input from a human or another device. Determining (602), by the service controller (301), whether the service controller (301) can perform the request autonomously may be carried out by determining whether the service controller has a historical record of successfully performing this type of request; and determining whether the priority/criterion of the request allows for the service controller to perform this type of request.

In the method of FIG. 6, selecting (302) from a first plurality of human interventionists, by a service controller (301), a first set of human interventionists to respond to a request associated with an autonomous device (303) includes selecting (604) from the first plurality of human interventionists, by the service controller (301), the first set of human interventionists to respond to the request in response to determining that the service controller (301) cannot perform the request autonomously. Selecting (604) from the first plurality of human interventionists, by the service controller (301), the first set of human interventionists to respond to the request in response to determining that the service controller (301) cannot perform the request autonomously may be carried out by identifying the one or more human interventionists that best satisfy a selection criterion/criteria that is specified by the service controller or the request. As will be explained below, the selection criteria may include one or more metrics, conditions, or requirements. Examples of the type of data in a selection criteria may include but are not limited to: requirements of the request, such as urgency, priority, difficulty, expense range; and the profiles of the human interventionists which may include information, such as type of interventionist devices associated with the interventionists and ratings of the interventionists according to various metrics, such as qualification, expense, availability, responsiveness, and accuracy.

In the method of FIG. 6, transmitting (304), by the service controller (301), the request to a first set (305) of interventionist devices includes transmitting (606), by the service controller (301), the request to the first set of interventionist devices in response to determining that the service controller (301) cannot perform the request autonomously. Transmitting (606), by the service controller (301), the request to the first set of interventionist devices in response to determining that the service controller (301) cannot perform the request autonomously may be carried out by modifying the request by reformatting, adding data, or removing data from the request; and sending the request via a wireless or wired communication network or connection to the interventionist device. For example, the request may be transmitted via an API, as an email, a text message, a link to a network location, and any other electronic means of relaying information from one device to another device.

In the method of FIG. 6, receiving (306) from the first set (305) of interventionist devices, by the service controller (301), a first set of interventionist responses to the request includes receiving (608) from the first set of interventionist devices, by the service controller (301), the first set of interventionist responses to the request in response to determining that the service controller (301) cannot perform the request autonomously. Receiving (608) from the first set of interventionist devices, by the service controller (301), the first set of interventionist responses to the request in response to determining that the service controller (301) cannot perform the request autonomously may be carried out by receiving data via a wireless or wired communication network or connection to the interventionist device.

Figure 7A:
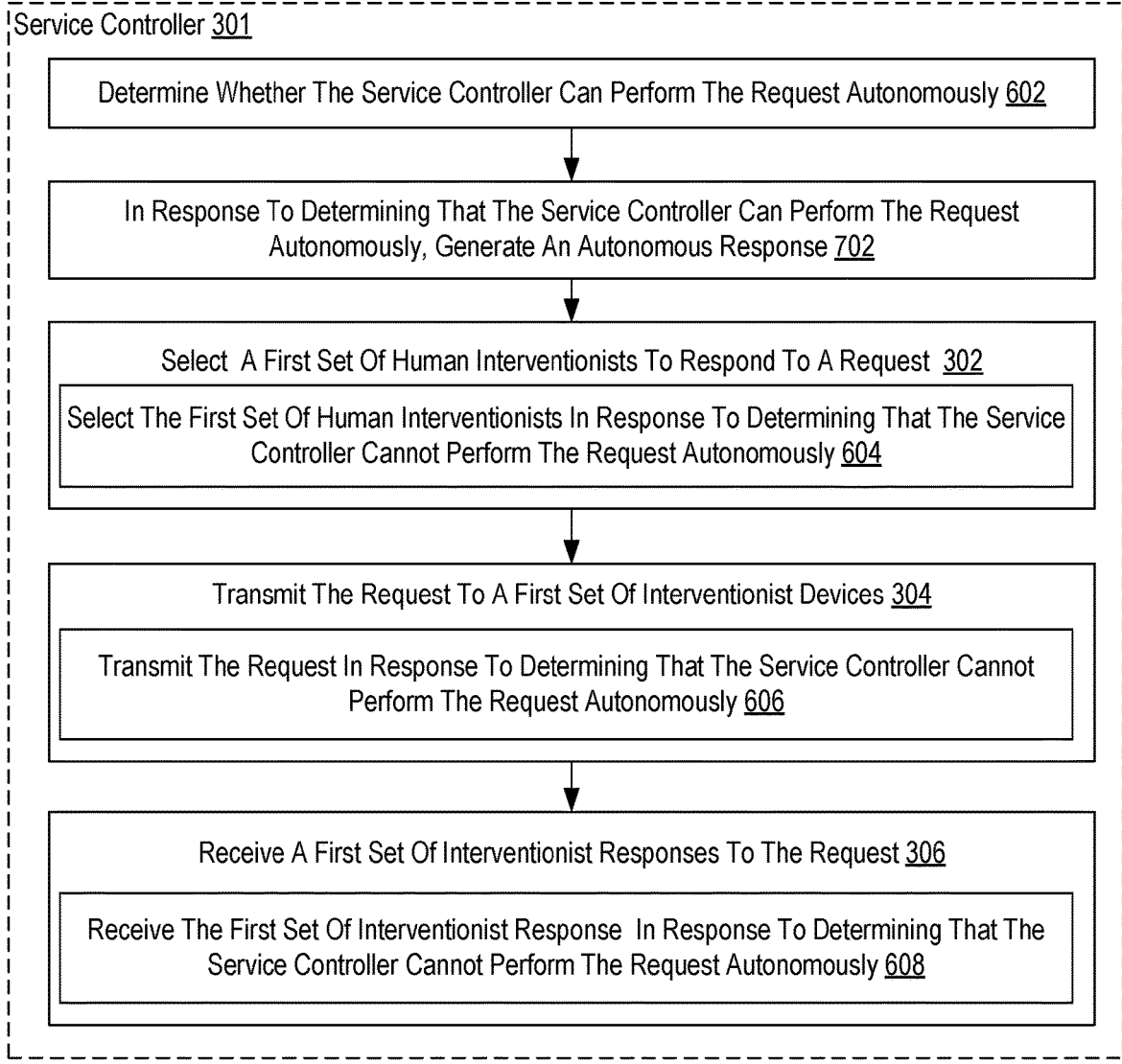
FIG. 7A sets forth a flowchart of another example method for facilitating human intervention in an autonomous device according to embodiments of the present disclosure.

For further explanation, FIG. 7A sets forth a flow chart illustrating an exemplary method for facilitating human intervention in an autonomous device according to embodiments of the present disclosure. The method of FIG. 7A is similar to the method of FIG. 6 in that the method of FIG. 7A also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

Like the method of FIG. 6, the method of FIG. 7A also includes determining (602), by the service controller (301), whether the service controller (301) can perform the request autonomously; selecting (604) from the first plurality of human interventionists, by the service controller (301), the first set of human interventionists to respond to the request is in response to determining that the service controller (301) cannot perform the request autonomously; transmitting (606), by the service controller (301), the request to the first set of interventionist devices is in response to determining that the service controller (301) cannot perform the request autonomously; receiving (608) from the first set of interventionist devices, by the service controller (301), the first set of interventionist responses to the request is in response to determining that the service controller (301) cannot perform the request autonomously.

However, unlike the method of FIG. 6, the method FIG. 7A includes in response to determining that the service controller (301) can perform the request autonomously, generating (702), by the service controller (301), an autonomous response. Generating (702), by the service controller (301), an autonomous response in response to determining that the service controller (301) can perform the request autonomously may be carried out by using autonomous instructions/processes/routines to decide a particular action to perform based only on instructions executing on the service controller. That is, in this particular example, performing an action autonomously may be carried out without receiving input from a human or another device. Deciding a particular action using autonomous instructions/processes/routines may be carried out by using historical decisions from human interventionists, computer simulations, or data from other sources; using instructions/routines/processes to identify patterns in past decisions; calculating probabilities of various solutions producing the correct result, and selecting the highest probability solution.

Figure 7B:
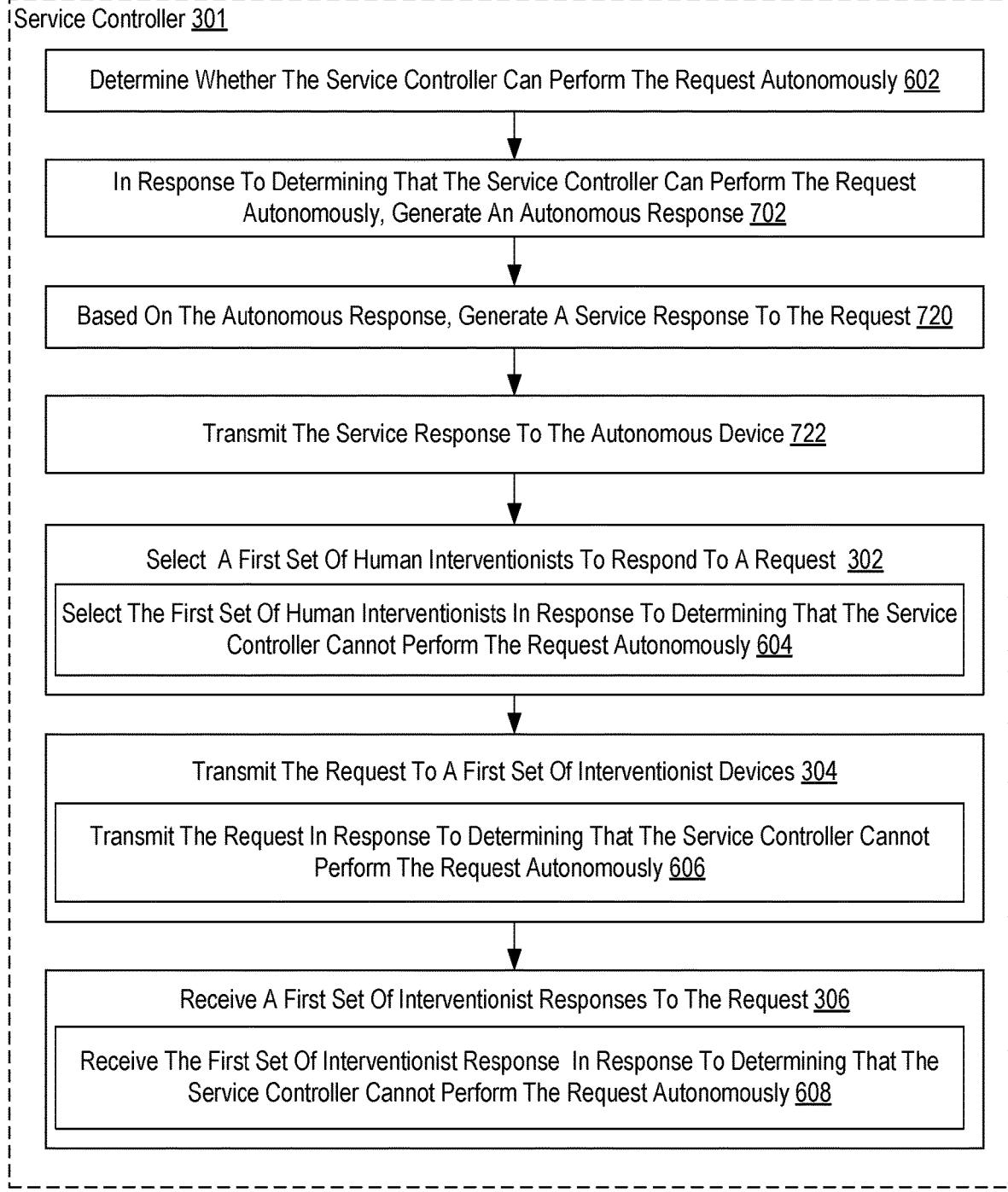
FIG. 7B sets forth a flowchart of another example method for facilitating human intervention in an autonomous device according to embodiments of the present disclosure.

For further explanation, FIG. 7B sets forth a flow chart illustrating an exemplary method for facilitating human intervention in an autonomous device according to embodiments of the present disclosure. The method of FIG. 7B is similar to the method of FIG. 7A in that the method of FIG. 7B also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

Like the method of FIG. 7A, the method of FIG. 7B also includes determining (602), by the service controller (301), whether the service controller (301) can perform the request autonomously; selecting (604) from the first plurality of human interventionists, by the service controller (301), the first set of human interventionists to respond to the request is in response to determining that the service controller (301) cannot perform the request autonomously; transmitting (606), by the service controller (301), the request to the first set of interventionist devices is in response to determining that the service controller (301) cannot perform the request autonomously; receiving (608) from the first set of interventionist devices, by the service controller (301), the first set of interventionist responses to the request is in response to determining that the service controller (301) cannot perform the request autonomously.

Furthermore, as in the method of FIG. 7A, the method FIG. 7B includes in response to determining that the service controller (301) can perform the request autonomously, generating (702), by the service controller (301), an autonomous response.

However, unlike the method of FIG. 7A, the method of FIG. 7B includes based on the autonomous response, generating (720), by the service controller (301), a service response to the request. Generating (720), by the service controller (301), a service response to the request based on the autonomous response may be carried out by using the autonomous response to create the service response, and modifying the autonomous response by reformatting, adding data, or removing data from the autonomous response.

The method of FIG. 7B also includes transmitting (722), by the service controller (301), the service response to the autonomous device. Transmitting (722), by the service controller (301), the service response to the autonomous device may be carried out by sending the response via a wireless or wired communication network or connection to the autonomous device. For example, the request may be transmitted via an API, as an email, a text message, a link to a network location, and any other electronic means of relaying information from one device to another device.

Figure 8:
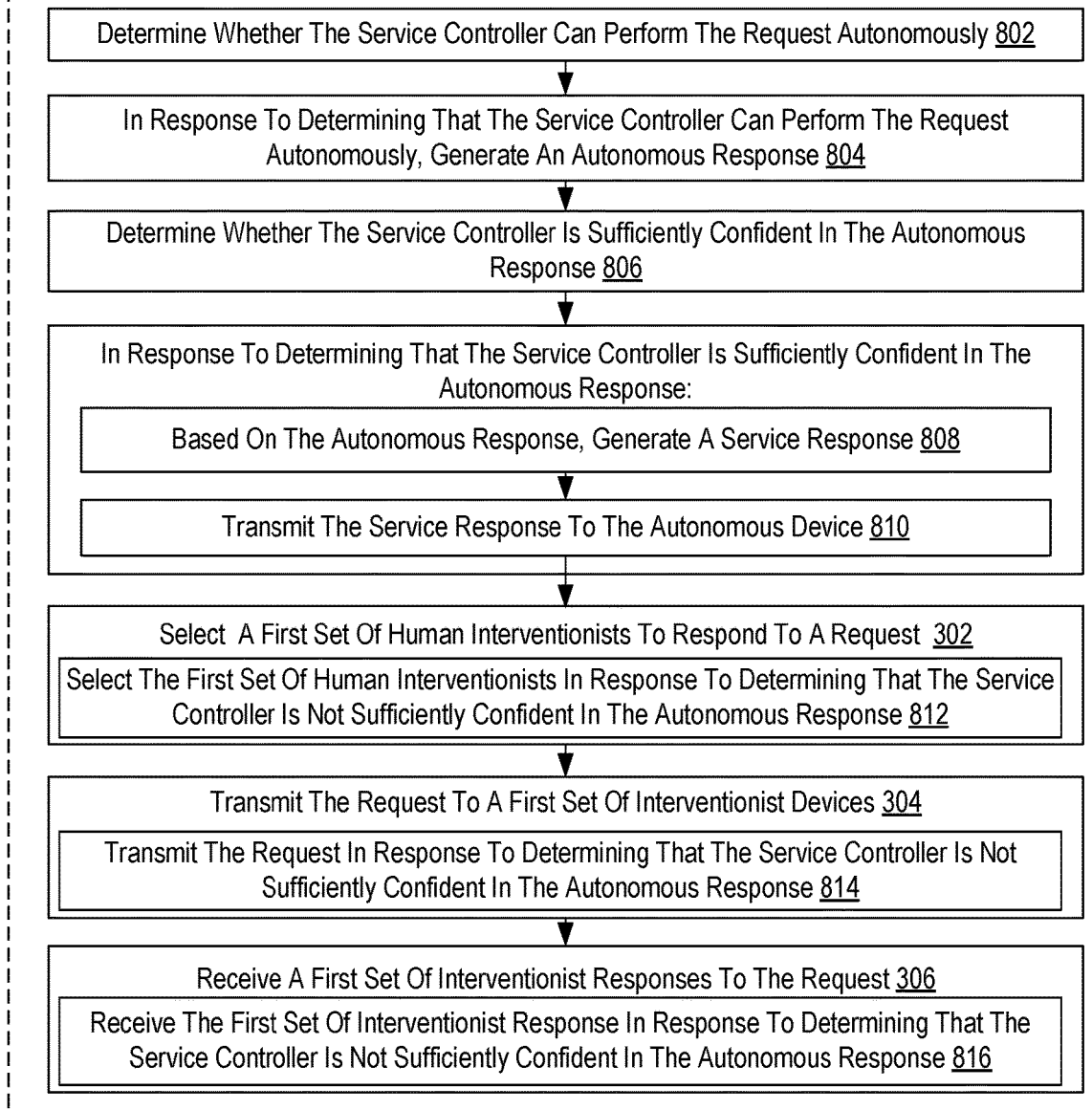
FIG. 8 sets forth a flowchart of another example method for facilitating human intervention in an autonomous device according to embodiments of the present disclosure.

For further explanation, FIG. 8 sets forth a flow chart illustrating an exemplary method for facilitating human intervention in an autonomous device according to embodiments of the present disclosure. The method of FIG. 8 is similar to the method of FIG. 3 in that the method of FIG. 8 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, the method of FIG. 8 includes determining (802), by the service controller (301), whether the service controller can perform the request autonomously. Performing the request autonomously may include deciding a particular action to perform based only on instructions executing on the autonomous device. That is, in this particular example, performing an action autonomously may be carried out without receiving input from a human or another device. Determining (802), by the service controller (301), whether the service controller can perform the request autonomously may be carried out by determining whether the service controller has a historical record of successfully performing this type of request; and determining whether the priority/criterion of the request allows for the service controller to perform this type of request.

The method of FIG. 8 includes in response to determining that the service controller (301) can perform the request autonomously, generating (804), by the service controller (301), an autonomous response. Generating (804), by the service controller (301), an autonomous response in response to determining that the service controller (301) can perform the request autonomously may be carried out by using autonomous instructions/processes/routines to decide a particular action to perform based only on instructions executing on the service controller. That is, in this particular example, performing an action autonomously may be carried out without receiving input from a human or another device. Deciding a particular action using autonomous instructions/processes/routines may be carried out by using historical decisions from human interventionists, computer simulations, or data from other sources; using instructions/routines/processes to identify patterns in past decisions; calculating probabilities of various solutions producing the correct result, and selecting the highest probability solution.

In addition, the method of FIG. 8 includes determining (806), by the service controller (301), whether the service controller is sufficiently confident in the autonomous response. Determining (806), by the service controller (301), whether the service controller is sufficiently confident in the autonomous response may be carried out by determining the confidence threshold requirement associated with the request; and determining whether a single autonomous response exceeds the confidence threshold. For example, certain interventions (perhaps for human-safety critical tasks) may require high accuracy/confidence. As will be explained below, in order to increase confidence, the service controller may distribute a single request to multiple human interventionists. Using statistical methods, the service controller may return intervention data with higher confidence, together with a statistical metric for this confidence (e.g. with 95% confidence, the true object location lies within the selected circle/sphere).

The method of FIG. 8 includes in response to determining that the service controller is sufficiently confident in the autonomous response: based on the autonomous response, generating (808), by the service controller (301), a service response to the request. Generating (808), by the service controller (301), a service response to the request may be carried out by using the autonomous response to create the service response, and modifying the autonomous response by reformatting, adding data, or removing data from the autonomous response.

The method of FIG. 8 includes in response to determining that the service controller is sufficiently confident in the autonomous response: transmitting (810), by the service controller (301), the service response to the autonomous device. Transmitting (810), by the service controller (301), the service response to the autonomous device may be carried out by sending the response via a wireless or wired communication network or connection to the autonomous device. For example, the request may be transmitted via an API, as an email, a text message, a link to a network location, and any other electronic means of relaying information from one device to another device In the method of FIG. 8, selecting (302) from a first plurality of human interventionists, by a service controller (301), a first set of human interventionists to respond to a request associated with an autonomous device (303) includes in response to determining that that the service controller is not sufficiently confident in the autonomous response, selecting (812) from a first plurality of human interventionists, by a service controller (301), a first set of human interventionists to respond to a request associated with an autonomous device (303). In the method of FIG. 8, transmitting (304), by the service controller (301), the request to a first set (305) of interventionist devices includes in response to determining that that the service controller is not sufficiently confident in the autonomous response, transmitting (814), by the service controller (301), the request to a first set (305) of interventionist devices. In the method of FIG. 8, receiving (306) from the first set (305) of interventionist devices, by the service controller (301), a first set of interventionist responses to the request includes in response to determining that that the service controller is not sufficiently confident in the autonomous response, receiving (816) from the first set (305) of interventionist devices, by the service controller (301), a first set of interventionist responses to the request.

Figure 9:
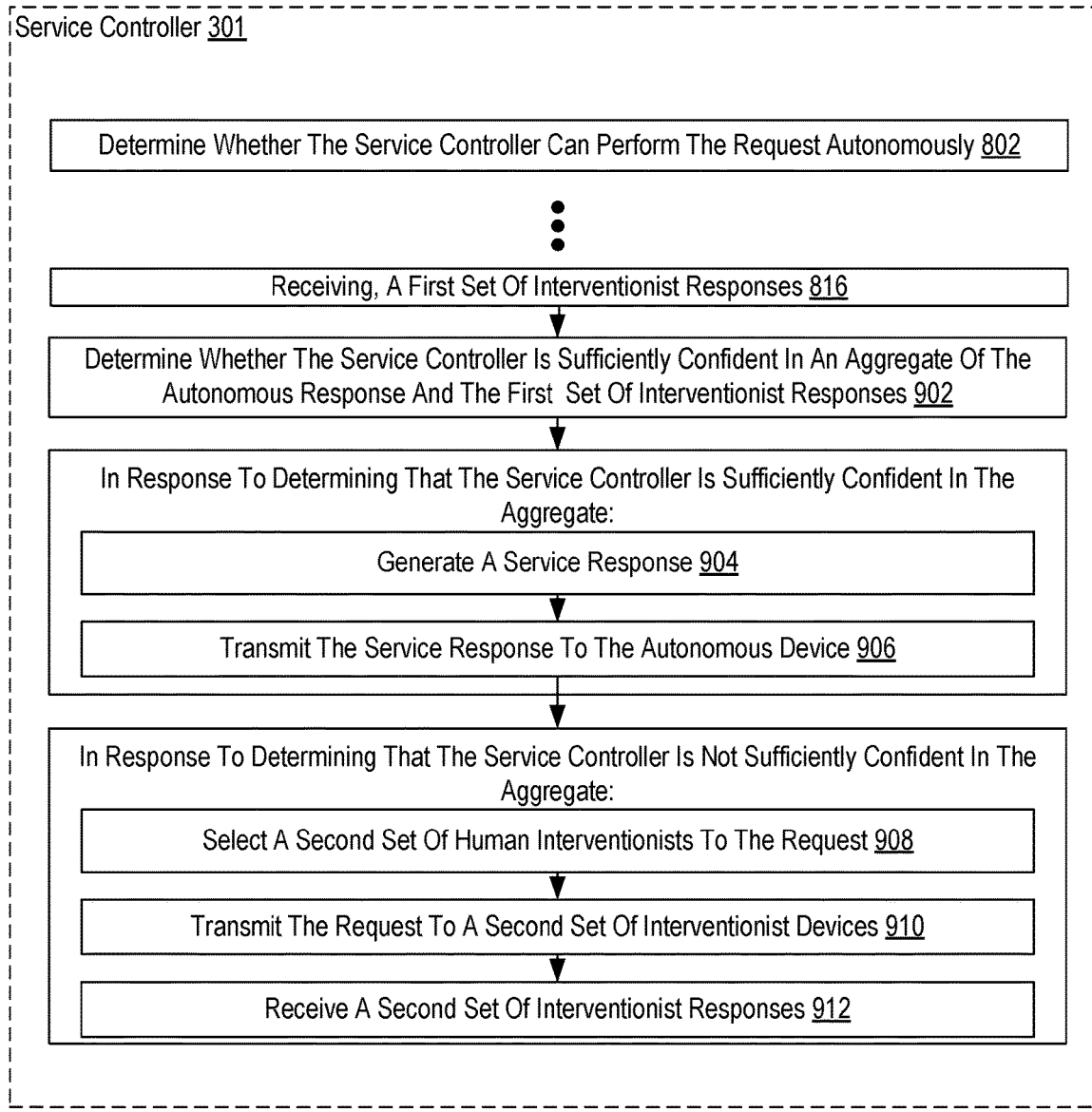
FIG. 9 sets forth a flowchart of another example method for facilitating human intervention in an autonomous device according to embodiments of the present disclosure.

For further explanation, FIG. 9 sets forth a flow chart illustrating an exemplary method for facilitating human intervention in an autonomous device according to embodiments of the present disclosure. The method of FIG. 9 is similar to the method of FIG. 8 in that the method of FIG. 9 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

As in the method of FIG. 8, the method of FIG. 9 also includes determining (802), by the service controller (301), whether the service controller can perform the request autonomously; in response to determining that the service controller (301) can perform the request autonomously, generating (804), by the service controller (301), an autonomous response; determining (806), by the service controller (301), whether the service controller is sufficiently confident in the autonomous response; in response to determining that the service controller is sufficiently confident in the autonomous response: based on the autonomous response, generating (808), by the service controller (301), a service response to the request; and transmitting (810), by the service controller (301), the service response to the autonomous device; in response to determining that that the service controller is not sufficiently confident in the autonomous response, selecting (812) from a first plurality of human interventionists, by a service controller (301), a first set of human interventionists to respond to a request associated with an autonomous device (303); in response to determining that that the service controller is not sufficiently confident in the autonomous response, transmitting (814), by the service controller (301), the request to a first set (305) of interventionist devices; in response to determining that that the service controller is not sufficiently confident in the autonomous response, receiving (816) from the first set (305) of interventionist devices, by the service controller (301), a first set of interventionist responses to the request.

However, unlike the method of FIG. 8, the method of FIG. 9 includes determining (902), by the service controller (301), whether the service controller (301) is sufficiently confident in an aggregate of the autonomous response and the first set of interventionist responses. Determining (902), by the service controller (301), whether the service controller (301) is sufficiently confident in the aggregate of the autonomous response and the first set of interventionist responses may be carried out by determining the confidence threshold requirement associated with the request; and determining whether the aggregate of the autonomous response and the first set of interventionist responses exceeds the confidence threshold.

The method of FIG. 9 includes in response determining that the service controller (301) is sufficiently confident in aggregate of autonomous response and the first set of interventionist responses: based on one of the first set of interventionist responses and the aggregate of the autonomous response and the first set of interventionist responses, generating (904), by the service controller (301), a service response to the request. Generating (904), by the service controller (301), a service response to the request may be carried out by using the aggregate of the autonomous response and the first set of responses to create the service response, averaging the responses, and modifying the responses by reformatting, adding data, or removing data from the response.

The method of FIG. 9 also includes in response determining that the service controller (301) is sufficiently confident in the aggregate of the autonomous response and the first set of interventionist responses: transmitting (906), by the service controller (301), the service response to the autonomous device. Transmitting (906), by the service controller (301), the service response to the autonomous device may be carried out by sending the response via a wireless or wired communication network or connection to the autonomous device.

In addition, the method of FIG. 9 includes in response to determining that the service controller (301) is not sufficiently confident in the aggregate of the autonomous response and the first set of interventionist responses: selecting (908) from a second plurality of human interventionists, by the service controller (301), a second set of human interventionists to respond to the request. In a particular embodiment, the second plurality of human interventionists may include one or more of the human interventionists of the first plurality of human interventionists. However, in a particular embodiment, the second plurality of human interventionists may include a completely different collection of human interventionists. Likewise, the second set of human interventionists may be the same as the first set, completely different from the first set, or include some but not all of the human interventionists of the first set. Selecting (908) from a second plurality of human interventionists, by the service controller (301), a second set of human interventionists to respond to the request may be carried out by identifying another set of human interventionists that best satisfies selection criteria that is specified by the service controller or the request. As will be explained below, the selection criteria may include one or more metrics, conditions, or requirements. Examples of the type of input for a selection criteria may include but are not limited to: requirements of the request, such as urgency, priority, difficulty, expense range; and the profiles of the human interventionists which may include information, such as type of interventionist devices associated with the interventionists and ratings of the interventionists according to various metrics, such as qualification, expense, availability, responsiveness, and accuracy.

The method of FIG. 9 includes in response to determining that the service controller (301) is not sufficiently confident in the aggregate of the autonomous response and the first set of interventionist responses: transmitting (910), by the service controller (301), the request to a second set of interventionist devices, each interventionist device of the second set of interventionist devices associated with a particular human interventionist in the second set of human interventionists. Transmitting (910), by the service controller (301), the request to a second set of interventionist devices may be carried out by sending the response via a wireless or wired communication network or connection to the interventionist device. For example, the request may be transmitted via an API, as an email, a text message, a link to a network location, and any other electronic means of relaying information from one device to another device.

The method of FIG. 9 includes in response to determining that the service controller (301) is not sufficiently confident in the aggregate of the autonomous response and the first set of interventionist responses: receiving (912), by the service controller (301), a second set of interventionist responses from the second set of interventionist devices. Receiving (912), by the service controller (301), a second set of interventionist responses from the second set of interventionist devices may be carried out by receiving data via a wireless or wired communication network or connection to the interventionist device.

For further explanation, FIG. 10 sets forth a flow chart illustrating an exemplary method for facilitating human intervention in an autonomous device according to embodiments of the present disclosure. The method of FIG. 10 is similar to the method of FIG. 3 in that the method of FIG. 10 includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, in the method of FIG. 10, selecting (302) from a first plurality of human interventionists, by a service controller (301), a first set of human interventionists to respond to a request associated with an autonomous device (303) includes determining (1002), for the request, an expense range and selection criteria. An expense range may specify an acceptable expense for using a human interventionist. Examples of expense range may include but are not limited to a not-to-exceed amount; a billing rate; and a formula for calculating an amount. Selection criteria may specify how the human interventionist is to be selected using the expense range. Determining (1002), for the request, an expense range and selection criteria may be carried out by retrieving from data within the request, the expense range and selection criteria; and using an identifier associated with the request to lookup in a database or data structure, an expense range and selection criteria.

In the method of FIG. 10, selecting (302) from a first plurality of human interventionists, by a service controller (301), a first set of human interventionists to respond to a request associated with an autonomous device (303) includes for one or more human interventionists of the first plurality of human interventionists, determining (1004) an interventionist expense for each of the one or more human interventionists, the interventionist expense indicating the cost of using the human interventionist to respond to the request. Determining (1004) an interventionist expense for each of the one or more human interventionists may be carried out by retrieving the expense from a data structure that specifies the expense of the human interventionist. In a particular embodiment, determining the expense may be carried out by calculating the expense for a human interventionist based on a specific time of the request and the fees associated with the human interventionist performing at the specific time.

In the method of FIG. 10, selecting (302) from a first plurality of human interventionists, by a service controller (301), a first set of human interventionists to respond to a request associated with an autonomous device (303) includes selecting (1006), from the first plurality of human interventionists, the first set of human interventionists based on the expense range, the selection criteria, and the interventionist expense of each of the one or more human interventionists. Selecting (1006), from the first plurality of human interventionists, the first set of human interventionists based on the expense range, the selection criteria, and the interventionist expense of each of the one or more human interventionists may be carried out by identifying the interventionist that best satisfies the selection criteria.

For example, a first human interventionist located in China may charge $100 for requests received between 1:30 GMT to 10:30 GMT and $300 for requests received between 10:30 GMT to 12:30 GMT. Continuing with this example, a second human interventionist located in Canada may charge $200 for requests received between 10:00 GMT to 18:00 GMT. In this example, if a first request is received at 10:15 GMT and the selection criteria requires that the human interventionist having the lowest expense should be selected, the service controller may select the first human interventionist. However, if a second request having the same selection criteria is received at 10:40 GMT, the service controller may select the second human interventionist.

For further explanation, FIG. 11 sets forth a flow chart illustrating an exemplary method for facilitating human intervention in an autonomous device according to embodiments of the present disclosure. The method of FIG. 11 is similar to the method of FIG. 3 in that the method of FIG. 11 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, in the method of FIG. 11, selecting (302) from a first plurality of human interventionists, by a service controller (301), a first set of human interventionists to respond to a request associated with an autonomous device (303) includes determining (1102), for the request, a difficulty rating and selection criteria. A difficulty rating may be an indication of the skills required to respond to the request. Determining (1102), for the request, a difficulty rating and selection criteria may be carried out by retrieving from data within the request, the difficulty rating and selection criteria; using an identifier associated with the request to lookup in a database or data structure, the difficulty rating and selection criteria.

In the method of FIG. 11, selecting (302) from a first plurality of human interventionists, by a service controller (301), a first set of human interventionists to respond to a request associated with an autonomous device (303) includes for one or more human interventionists of the first plurality of human interventionists, determining (1104) a qualification rating of each of the one or more human interventionists. A qualification rating may be an indication of the skills of the human interventionist. Determining (1104) a qualification rating of each of the one or more human interventionists may be carried out by retrieving the qualification rating from a data structure that specifies the rating of the human interventionist.

In the method of FIG. 11, selecting (302) from a first plurality of human interventionists, by a service controller (301), a first set of human interventionists to respond to a request associated with an autonomous device (303) includes selecting (1106), from the first plurality of human interventionists, the first set of human interventionists based on the difficulty rating, the selection criteria, and the qualification rating of the one or more human interventionists. Selecting (1106), from the first plurality of human interventionists, the first set of human interventionists based on the difficulty rating, the selection criteria, and the qualification rating of the one or more human interventionists may be carried out by identifying the interventionist that best satisfies the selection criteria.

In a particular embodiment, the selection criteria may specify selecting the human interventionist having the lowest qualification rating that still satisfies the difficulty rating of the request. For example, a medical robot may send a request for help closing a suture. In this example, the difficult rating may require a qualification rating associated with a nurse level practitioner. Continuing with this example, based on the criteria, the service controller may select a first human interventionist having a qualification rating indicating a nurse level practitioner over a second human interventionist having a qualification rating indicating a surgeon level practitioner. Alternatively, the selection criteria may require selecting the human intervention having the highest qualification rating. As explained above, the qualification rating and difficulty rating may be used in conjunction with other metrics, such as expense, availability, and performance metrics to select a human interventionist.

Figure 12:
FIG. 12 sets forth a flowchart of another example method for facilitating human intervention in an autonomous device according to embodiments of the present disclosure.

For further explanation, FIG. 12 sets forth a flow chart illustrating an exemplary method for facilitating human intervention in an autonomous device according to embodiments of the present disclosure. The method of FIG. 12 is similar to the method of FIG. 3 in that the method of FIG. 12 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, the method of FIG. 12, selecting (302) from a first plurality of human interventionists, by a service controller (301), a first set of human interventionists to respond to a request associated with an autonomous device (303) includes for one or more human interventionists of the first plurality of human interventionists, determining (1202), by the service controller (301), a responsiveness of each of the one or more human interventionists. Determining (1202), by the service controller (301), a responsiveness of each of the one or more human interventionists may be carried out by using historical data indicating past response times of the human interventionist; and using test results that indicate recent or current responsiveness of the human interventionist. In a particular embodiment, determining (1202), by the service controller (301), a responsiveness of the human interventionist may be carried out by periodically testing a human interventionist by sending sample requests to the human interventionist; measuring the time for the human interventionist to respond; and determining whether the measured time exceeds a threshold. Alternatively, the service controller may measure the signals from the interventionist device to determine whether the human interventionists is active on the device. In this example, the service controller may determine whether the level of activity exceeds a threshold.

In the method of FIG. 12, selecting (302) from a first plurality of human interventionists, by a service controller (301), a first set of human interventionists to respond to a request associated with an autonomous device (303) includes determining (1204), for the request, an urgency rating and selection criteria. Determining (1204), for the request, an urgency rating and selection criteria may be carried out by retrieving from data within the request, the urgency rating and selection criteria; and using an identifier associated with the request to lookup in a database or data structure, an urgency rating and selection criteria.

In the method of FIG. 12, selecting (302) from a first plurality of human interventionists, by a service controller (301), a first set of human interventionists to respond to a request associated with an autonomous device (303) includes selecting (1206), from the first plurality of human interventionists, the first set of human interventionists based on the urgency rating, the selection criteria, and the responsiveness of each of the one or more human interventionists. Selecting (1206), from the first plurality of human interventionists, the first set of human interventionists based on the urgency rating, the selection criteria, and the responsiveness of each of the one or more human interventionists may be carried out by identifying the human interventions that best satisfies the selection criteria.

For example, an urgency rating may specify that a response to the particular request is received within two minutes. In this example, the service controller may determine that two human interventionists have predicted latency values that indicate the human interventionist would respond in under two minutes. The service controller may apply other metrics/criteria to select between the two identified human interventionists. For example, the selection criterion may specify selecting the human interventionist with the highest qualification rating and the lowest expense that meets an urgency latency threshold.

Figure 13:
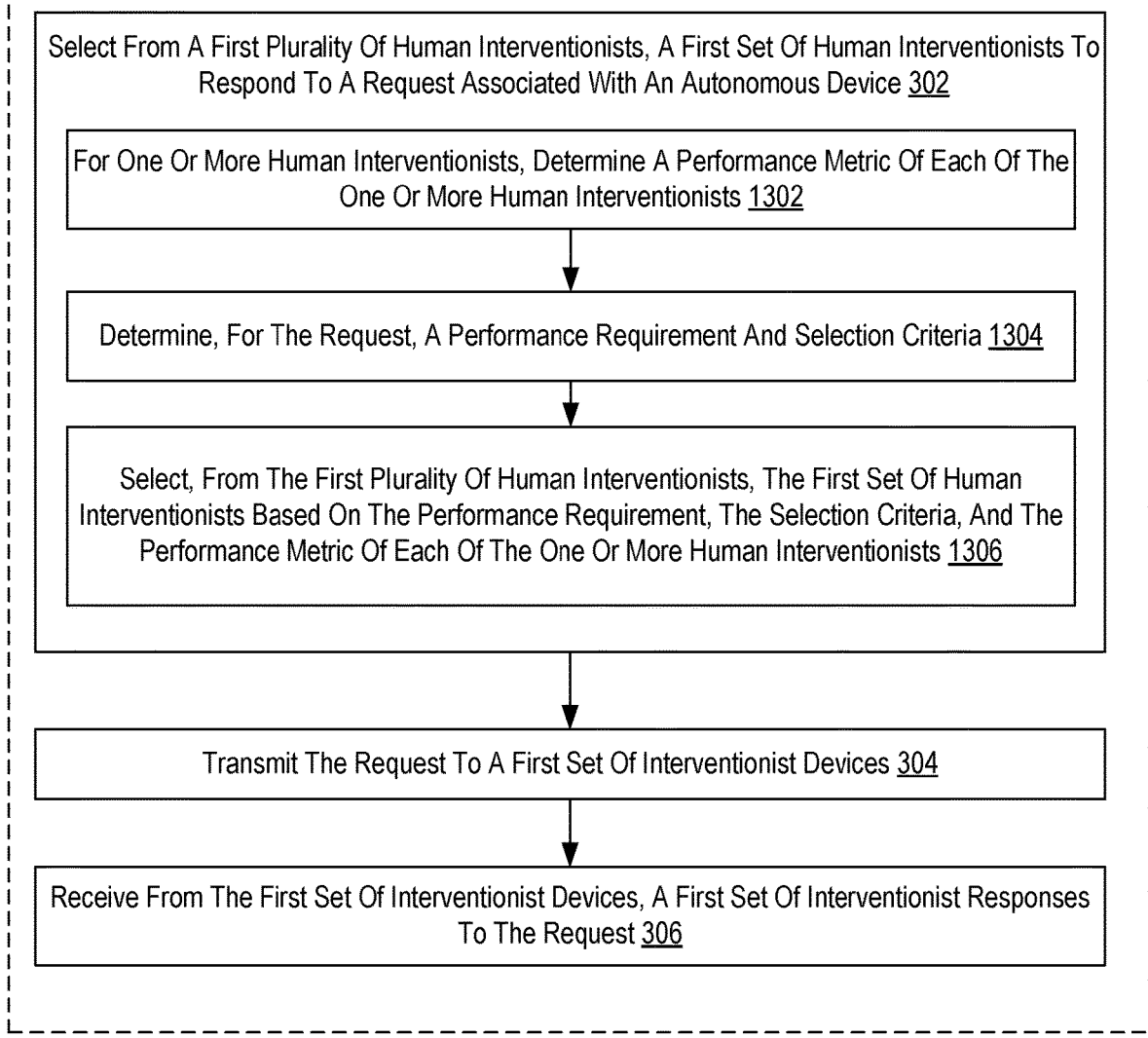
FIG. 13 sets forth a flowchart of another example method for facilitating human intervention in an autonomous device according to embodiments of the present disclosure.

For further explanation, FIG. 13 sets forth a flow chart illustrating an exemplary method for facilitating human intervention in an autonomous device according to embodiments of the present disclosure. The method of FIG. 13 is similar to the method of FIG. 3 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, in the method of FIG. 13, selecting (302) from a first plurality of human interventionists, by a service controller (301), a first set of human interventionists to respond to a request associated with an autonomous device (303) includes for one or more human interventionists of the first plurality of human interventionists, determining (1302), by the service controller (301), a performance metric of each of the one or more human interventionists. A performance metric is an indicator of the performance of a human interventionist. Examples of performance metrics include but are not limited to assessments of latency, responsiveness, bandwidth, accuracy, precision, recall, F-1, and repeatability. Determining (1302), by the service controller (301), a performance metric of the human interventionist may be carried out by examining historical performance of the human interventionists; and periodically testing the human interventionist.

In the method of FIG. 13, selecting (302) from a first plurality of human interventionists, by a service controller (301), a first set of human interventionists to respond to a request associated with an autonomous device (303) includes determining (1304), for the request, a performance requirement and selection criteria. A performance requirement may be an indication of a threshold number associated with a particular type of performance metric. The selection criteria may specify how the human intervention is to be selected using the performance requirement. Determining (1304), for the request, a performance requirement and selection criteria may be carried out by retrieving from data within the request, the performance requirement and selection criteria; and using an identifier associated with the request to lookup in a database or data structure, the performance requirement and selection criteria.

In the method of FIG. 13, selecting (302) from a first plurality of human interventionists, by a service controller (301), a first set of human interventionists to respond to a request associated with an autonomous device (303) includes selecting (1306), from the first plurality of human interventionists, the first set of human interventionists based on the performance requirement, the selection criteria, and the performance metric of each of the one or more human interventionists. Selecting (1306), from the first plurality of human interventionists, the first set of human interventionists based on the performance requirement, the selection criteria, and the performance metric of each of the one or more human interventionists may be carried out by identifying the interventionist that best satisfies the selection criteria.

For example, one performance metric may indicate a score on a test that requires a human intervention to identify objects. In this example, the performance requirement may specify a threshold test score and the selection criteria may specify selecting a human interventionist with a score above the threshold.

Figure 14:
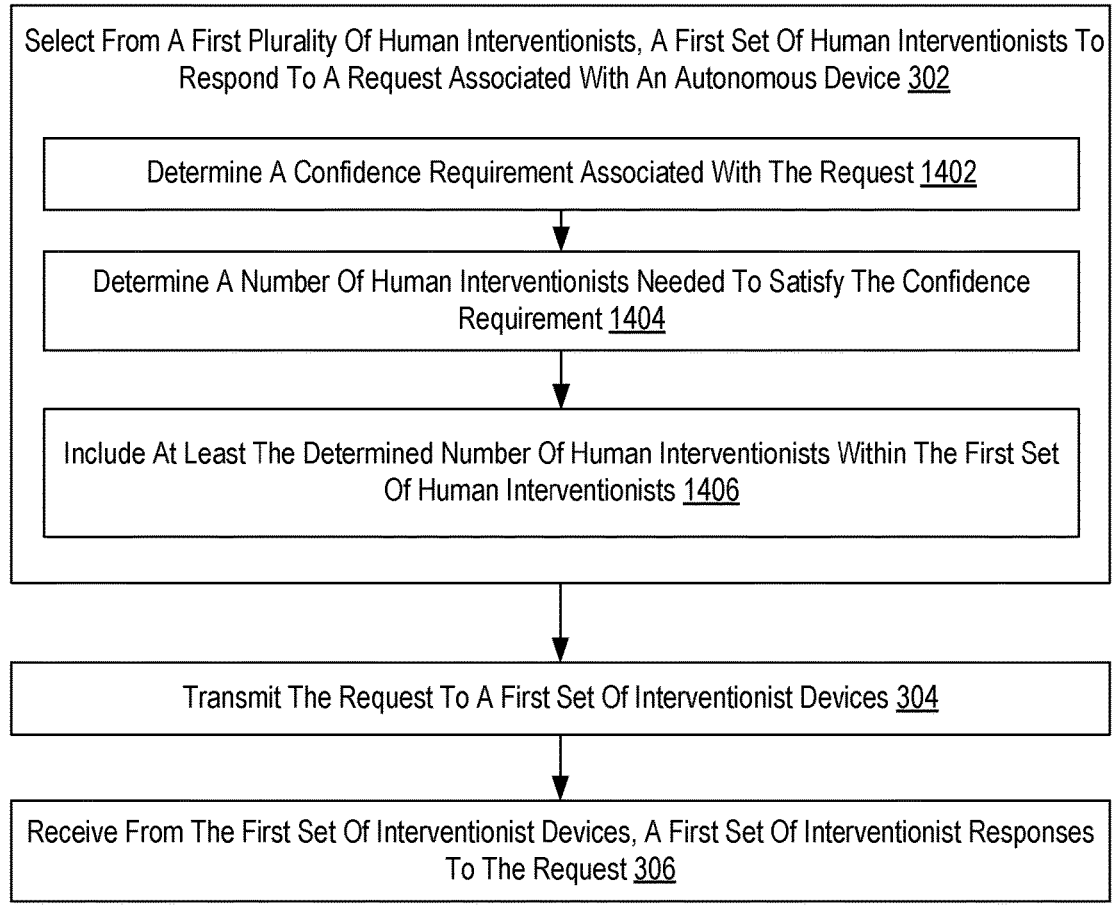
FIG. 14 sets forth a flowchart of another example method for facilitating human intervention in an autonomous device according to embodiments of the present disclosure.

For further explanation, FIG. 14 sets forth a flow chart illustrating an exemplary method for facilitating human intervention in an autonomous device according to embodiments of the present disclosure. The method of FIG. 14 is similar to the method of FIG. 3 in that the method of FIG. 14 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, in the method of FIG. 14, selecting (302) from a first plurality of human interventionists, by a service controller (301), a first set of human interventionists to respond to a request associated with an autonomous device (303) includes determining (1402), by the service controller (301), a confidence requirement associated with the request. In a particular embodiment, performances of human interventionists may be modeled to estimate accuracy and consistency of the human interventionists performing the task. Determining (1402), by the service controller (301), a confidence requirement associated with the request may be carried out by modeling the performance of a group of human interventionists to determine the parameters and qualities of the human interventionists that would be required to perform a particular task with a required level of accuracy and consistency. Examples of modeling methods include but are not limited to means, medians, regressions, probability distributions, mixture models (e.g., Gaussian), Kernel Density Estimation, and clustering.

In the method of FIG. 14, selecting (302) from a first plurality of human interventionists, by a service controller (301), a first set of human interventionists to respond to a request associated with an autonomous device (303) includes determining (1404) a number of human interventionists needed to satisfy the confidence requirement. Determining (1404) a number of human interventionists needed to satisfy the confidence requirement may be carried out by using a model to determine a minimum number of human interventionists for a set of human interventionists to achieve as a group, a desired accuracy and consistency.

In the method of FIG. 14, selecting (302) from a first plurality of human interventionists, by a service controller (301), a first set of human interventionists to respond to a request associated with an autonomous device (303) includes including (1406) at least the determined number of human interventionists within the first set of human interventionists.

For further explanation, FIG. 15 sets forth a flow chart illustrating an exemplary method for facilitating human intervention in an autonomous device according to embodiments of the present disclosure. The method of FIG. 15 is similar to the method of FIG. 3 in that the method of FIG. 15 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, in the method of FIG. 15, selecting (302) from a first plurality of human interventionists, by a service controller (301), a first set of human interventionists to respond to a request associated with an autonomous device (303) includes determining (1502) a type of task to be performed, by a human interventionist, for responding to the request. Examples of types of tasks to be performed may include but are not limited to identifying an object to select; identifying a location; identifying a label for an object or action; selecting from a plurality of choices, an action or task; identifying a route; selecting from one or more menus; and providing a voice or text message. Determining (1502) a type of task to be performed, by a human interventionist, for responding to the request may be carried out by determining a task code within the request; and analyzing data within the request.

In the method of FIG. 15, selecting (302) from a first plurality of human interventionists, by a service controller (301), a first set of human interventionists to respond to a request associated with an autonomous device (303) includes determining (1504) a type of interventionist device for performing the task. Determining (1504) a type of interventionist device for performing the task may be carried out by matching a task code with an interventionist device code.

In the method of FIG. 15, selecting (302) from a first plurality of human interventionists, by a service controller (301), a first set of human interventionists to respond to a request associated with an autonomous device (303) includes selecting (1506) for the first set of human interventionists, a particular human interventionist having a particular interventionist device matching the determined type of interventionist device. Selecting (1506) for the first set of human interventionists, a particular human interventionist having a particular interventionist device matching the determined type of interventionist device may be carried out by identifying a human interventionist having an associated interventionist device that matches/satisfies the type of required interventionist device.

For example, a request for movement guidance from a medical robot may require a human interventionist to use a specific interventionist device, such as a virtual reality glove, to provide the response. As another example, a request for landing coordinates from a UAV may require a human interventionist to use a joystick as the interventionist device to provide the response.

For further explanation, FIG. 16 sets forth a flow chart illustrating an exemplary method for facilitating human intervention in an autonomous device according to embodiments of the present disclosure. The method of FIG. 16 is similar to the method of FIG. 3 in that the method of FIG. 3 is similar to the method of FIG. 16 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

In the method of FIG. 16, selecting (302) from a first plurality of human interventionists, by a service controller (301), a first set of human interventionists to respond to a request associated with an autonomous device (303) includes determining (1602) a type of task to be performed by a human interventionist, for responding the request. Examples of types of tasks to be performed may include but are not limited to identifying an object to select; identifying a location; identifying a label for an object or action; selecting from a plurality of choices, an action or task; identifying a route; selecting from one or more menus; providing a voice or text message. Determining (1602) a type of task to be performed by a human interventionist, for responding the request may be carried out by matching a task code with an interventionist device code.

In the method of FIG. 16, selecting (302) from a first plurality of human interventionists, by a service controller (301), a first set of human interventionists to respond to a request associated with an autonomous device (303) includes selecting (1604) for the first set of human interventionists, a particular human interventionist having a profile indicating the capability of performing the type of task to be performed for responding to the request. Selecting (1604) for the first set of human interventionists, a particular human interventionist having a profile indicating the capability of performing the type of task to be performed for responding to the request may be carried out by examining a profile for an indication that the human interventionist can perform the task or behavior required in the request; and matching the task code with an interventionist skill code in the interventionist's profile.

Figure 17:
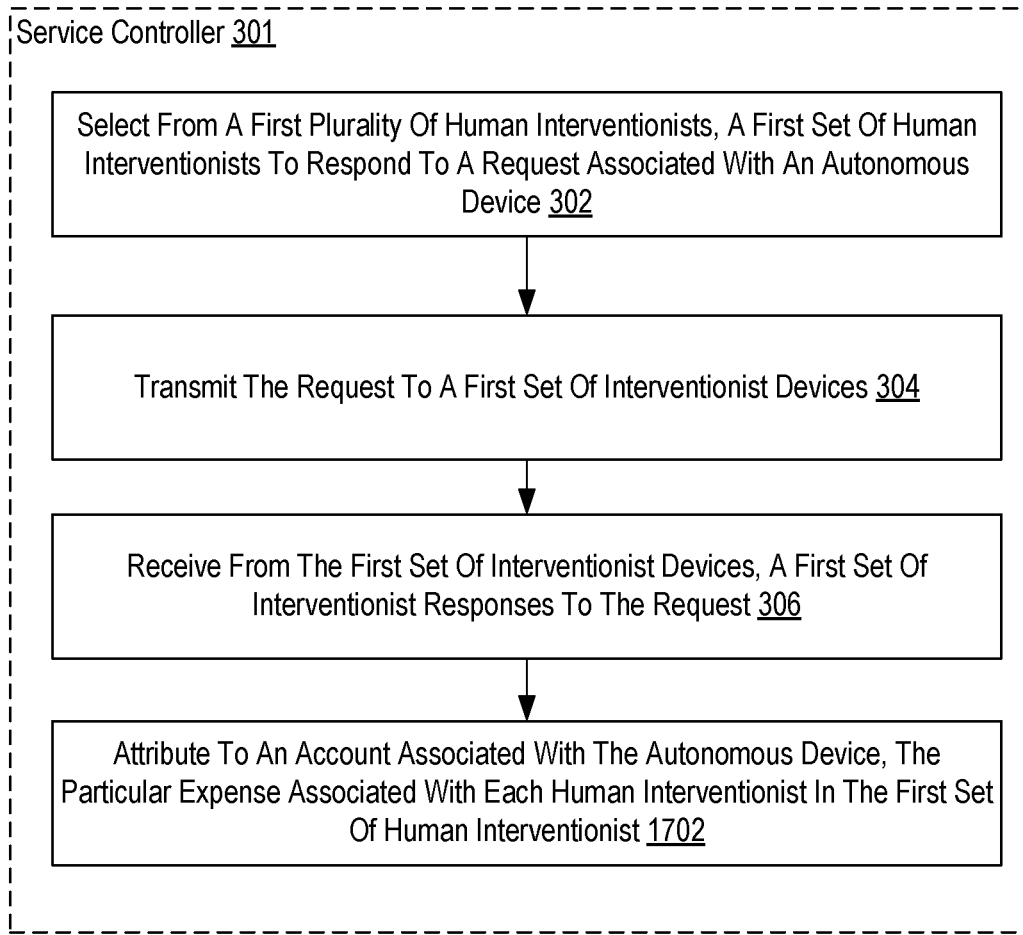
FIG. 17 sets forth a flowchart of another example method for facilitating human intervention in an autonomous device according to embodiments of the present disclosure.

For further explanation, FIG. 17 sets forth a flow chart illustrating an exemplary method for facilitating human intervention in an autonomous device according to embodiments of the present disclosure. The method of FIG. 17 is similar to the method of FIG. 3 also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, the method of FIG. 17 includes attributing (1702) to an account associated with the autonomous device, by the service controller (1301), the particular expense associated with each human interventionist in the first set of human interventionists. In a particular embodiment, each human interventionist in the first set of human interventionists has an associated expense for performing a particular type of request. Attributing (1702) to an account associated with the autonomous device, by the service controller (1301), the particular expense associated with each human interventionist in the first set of human interventionists may be carried out by calculating the expense of the selected human interventionists and debiting the expense to an account associated with the interventionist device.

For further explanation, FIG. 18 sets forth a flow chart illustrating an exemplary method for facilitating human intervention in an autonomous device according to embodiments of the present disclosure that includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

The method of FIG. 18 includes for one or more human interventionists in the first plurality of human interventionists: transmitting (1802), by the service controller (1301), a test request to a particular interventionist device associated with a particular human interventionist. Transmitting (1802), by the service controller (1301), a test request to a particular interventionist device associated with a particular human interventionist may be carried out by sending a historical request to the interventionist device; and sending a sample request to the interventionist device.

The method of FIG. 18 also includes for one or more human interventionists in the first plurality of human interventionists: receiving (1804) from the particular interventionist device, by the service controller (1301), a test response to the transmitted test request. Receiving (1804) from the particular interventionist device, by the service controller (1301), a test response to the transmitted test request may be carried out by receiving data in response to the request.

The method of FIG. 18 includes for one or more human interventionists in the first plurality of human interventionists: based on the test response, generating (1806), by the service controller (1301), a performance metric of the human interventionist. Generating (1806), by the service controller (1301), a performance metric of the human interventionist may be carried out by comparing the response to a historical response; comparing the response to a known or preferred solution of the request.

In addition, the method of FIG. 18 also includes based on the performance metrics of each of the one or more human interventionists of the first plurality of human interventionists, determining (1808), by the service controller (1301), a rating for each of the one or more human interventionists. Determining (1808), by the service controller (1301), a rating for each of the one or more human interventionists may be carried out by sorting the results of the comparisons.

In the method of FIG. 18, selecting (302) from a first plurality of human interventionists, by a service controller (301), a first set of human interventionists to respond to a request associated with an autonomous device (303) includes selecting (1810), based on the determined ratings, the first set of human interventionists. Selecting (1810), based on the determined ratings, the first set of human interventionists may be carried out by identifying and selecting the human interventionist with the rating indicating the lowest latency.

Figure 19A:
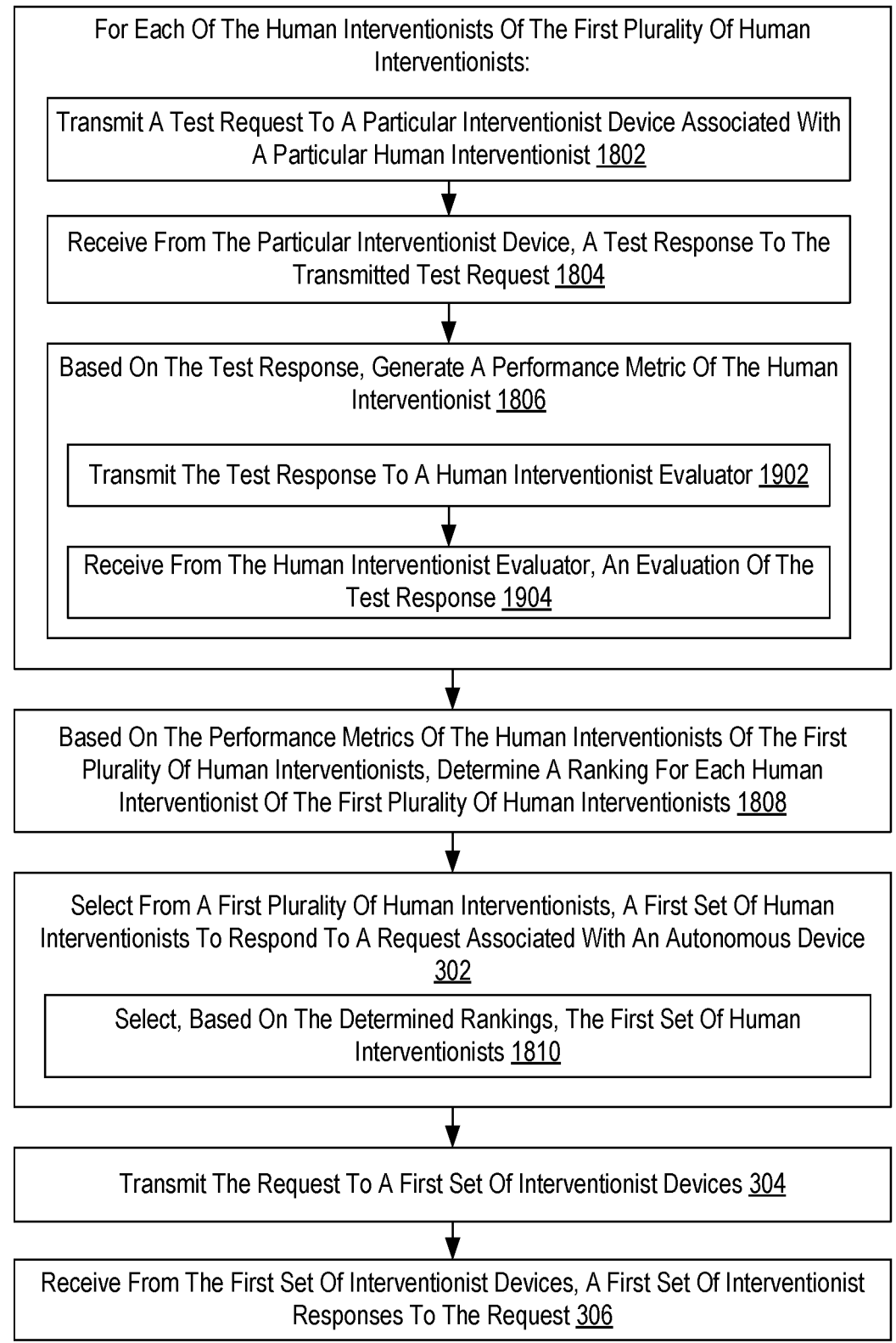
FIG. 19A sets forth a flowchart of another example method for facilitating human intervention in an autonomous device according to embodiments of the present disclosure.

For further explanation, FIG. 19A sets forth a flow chart illustrating an exemplary method for facilitating human intervention in an autonomous device according to embodiments of the present disclosure. The method of FIG. 19A is similar to the method of FIG. 18 in that the method of FIG. 19A also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

As in the method of FIG. 18, the method of FIG. 19A also includes for each of the human interventionists of the first plurality of human interventionists: transmitting (1802), by the service controller (1301), a test request to a particular interventionist device associated with a particular human interventionist; receiving (1804) from the particular interventionist device, by the service controller (1301), a test response to the transmitted test request; and based on the test response, generating (1806), by the service controller (1301), a performance metric of the human interventionist. The method of FIG. 19A also includes based on the performance metrics of the human interventionists of the first plurality of human interventionists, determining (1808), by the service controller (1301), a rating for each human interventionist of the first plurality of human interventionists; and selecting (1810), based on the determined ratings, the first set of human interventionists.

However, unlike the method FIG. 18, the method of FIG. 19A includes transmitting (1902) the test response to a human interventionist evaluator. A human intervention evaluator may be a supervisor human interventionist. Alternatively, the human interventionist evaluator may be an autonomous module that includes computer program instructions. Transmitting (1902) the test response to a human interventionist evaluator may be carried out by modifying the test response by reformatting, adding data, or removing data from the test response; and sending the test response via a wireless or wired communication network or connection to the human interventionist evaluator. For example, the request may be transmitted via an API, as an email, a text message, a link to a network location, and any other electronic means of relaying information from one device to another device.

The method of FIG. 19A also includes receiving (1904) from the human interventionist evaluator, an evaluation of the test response. An evaluation of the test response may include a binary decision of whether the human interventionist made the correct decision. The evaluation may also include a determination or indication of the correct or preferred solution. Receiving (1904) from the human interventionist evaluator, an evaluation of the test response may be carried out by receiving data via a wireless or wired communication network or connection to the human interventionist evaluator.

For further explanation, FIG. 19B sets forth a flow chart illustrating an exemplary method for facilitating human intervention in an autonomous device according to embodiments of the present disclosure. The method of FIG. 19B is similar to the method of FIG. 3 in that the method of FIG. 19B also includes selecting (302) from a first plurality of human interventionists, by a service controller (301), a first set of human interventionists to respond to a request associated with an autonomous device (303); transmitting (304), by the service controller (301), the request to a first set (305) of interventionist devices; and receiving (306) from the first set (305) of interventionist devices, by the service controller (301), a first set of interventionist responses to the request.

However, unlike the method of FIG. 3, in the method of FIG. 19B, selecting (302) from a first plurality of human interventionists, by a service controller (301), a first set of human interventionists to respond to a request associated with an autonomous device (303) includes determining (1920), by the service controller (301), whether a particular human interventionist is available. Determining (1920), by the service controller (301), whether a particular human interventionist is available may be carried out by periodically testing a human interventionist by sending sample requests to the human interventionist; measuring the time for the human interventionist to respond; and determining whether the measured time exceeds a threshold. Alternatively, the service controller may measure the signals from the interventionist device to determine whether the human interventionists is active on the device. In this example, the service controller may determine whether the level of activity exceeds a threshold.

The method of FIG. 19B also includes in response to determining that the particular human interventionist is not available, excluding (1922), by the service controller (301), the particular human interventionist from the first set of human interventionists to respond to the request. Excluding (1922), by the service controller (301), the particular human interventionist from the first set of human interventionists to respond to the request may be carried out by removing the human interventionist from the list of human interventionists that are available to be included in the plurality of human interventionists In addition, the method of FIG. 19B also includes in response to determining that the particular human interventionist is available, adding (1924), by the service controller (301), the particular human interventionist to the first set of human interventionists to respond to the request. Adding (1924), by the service controller (301), the particular human interventionist to the first set of human interventionists to respond to the request may be carried out by adding the human interventionist to the list of human interventionists that are available to be included in the plurality of human interventionists.

Figure 20:
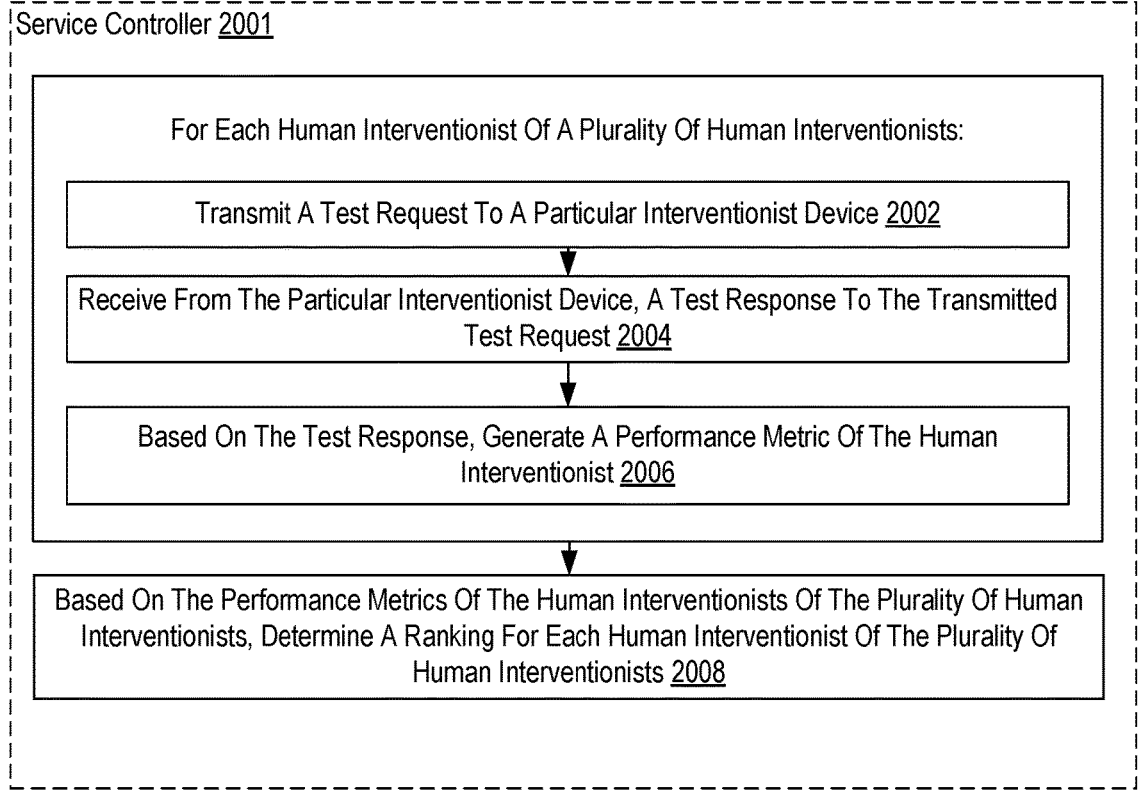
FIG. 20 sets forth a flowchart of another example method for facilitating human intervention in an autonomous device according to embodiments of the present disclosure.

For further explanation, FIG. 20 sets forth a flow chart illustrating an exemplary method for facilitating human intervention in an autonomous device according to embodiments of the present disclosure. The method of FIG. 20 includes for each human interventionist of a plurality of human interventionists: transmitting (2002), by a service controller (2001), a test request to a particular interventionist device associated with a particular human interventionist. Transmitting (2002), by a service controller (2001), a test request to a particular interventionist device associated with a particular human interventionist may be carried out by sending a historical request to the interventionist device; and sending a sample request to the interventionist device.

The method of FIG. 20 includes for each human interventionist of a plurality of human interventionists: receiving (2004) from the particular interventionist device, by the service controller (2001), a test response to the transmitted test request. Receiving (2004) from the particular interventionist device, by the service controller (2001), a test response to the transmitted test request may be carried out by receiving data in response to the request.

In addition, the method of FIG. 20 includes for each human interventionist of a plurality of human interventionists: based on the test response, generating (2006), by the service controller (2001), a performance metric of the human interventionist. Generating (2006), by the service controller (2001), a performance metric of the human interventionist may be carried out by comparing the response to a historical response; and comparing the response to a known or preferred solution of the request.

The method of FIG. 20 includes based on the performance metrics of the human interventionists of the plurality of human interventionists, determining (2008), by the service controller (2001), a rating for each human interventionist of the plurality of human interventionists. Determining (2008), by the service controller (2001), a rating for each human interventionist of the plurality of human interventionists may be carried out by comparing the performance metrics of each human interventionists and sorting the results of the comparison.

Figure 21:
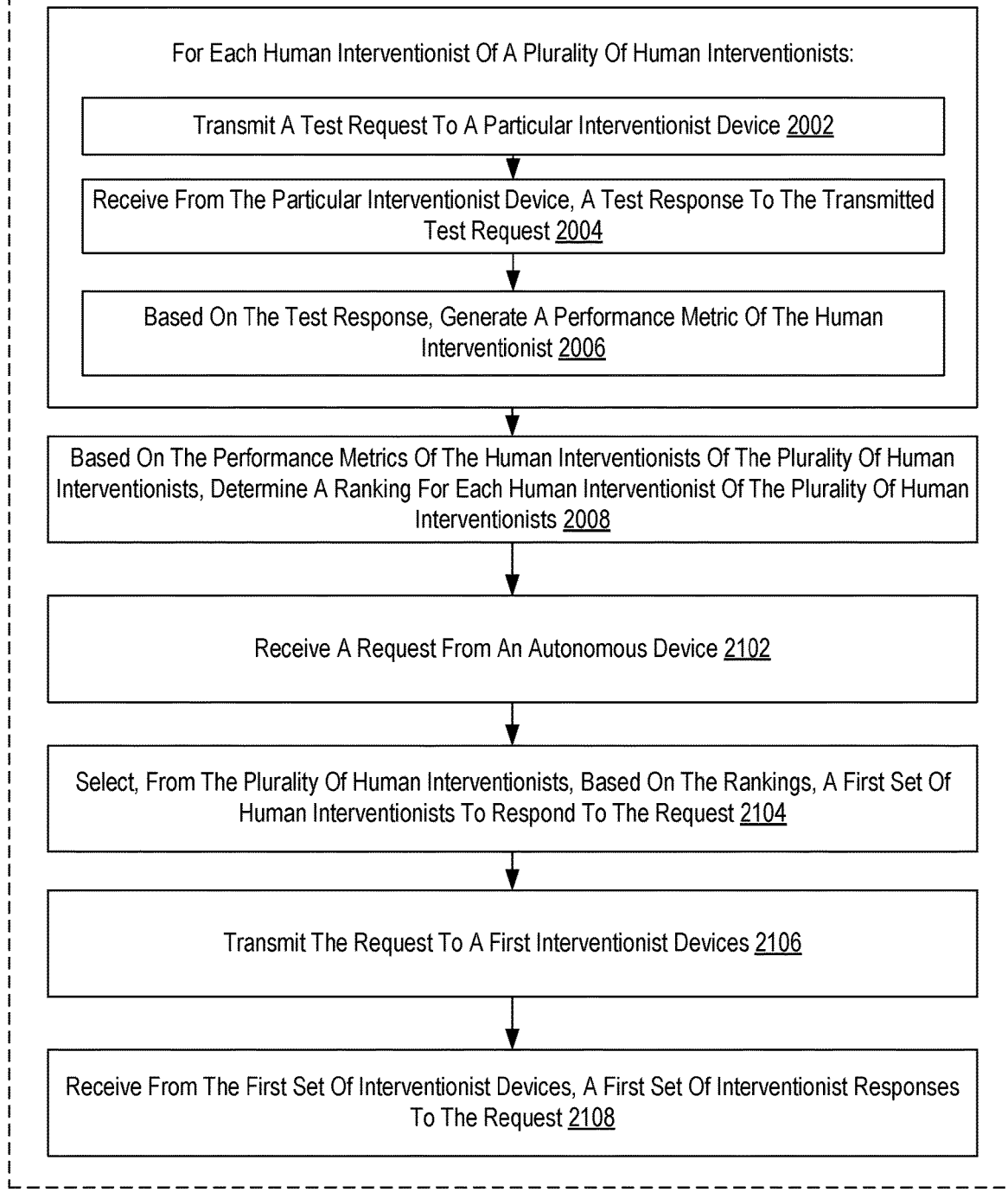
FIG. 21 sets forth a flowchart of another example method for facilitating human intervention in an autonomous device according to embodiments of the present disclosure.

For further explanation, FIG. 21 sets forth a flow chart illustrating an exemplary method for facilitating human intervention in an autonomous device according to embodiments of the present disclosure. The method of FIG. 21 is similar to the method of FIG. 20 in that the method of FIG. 21 also includes for each human interventionist of a plurality of human interventionists: transmitting (2002), by a service controller (2001), a test request to a particular interventionist device associated with a particular human interventionist; receiving (2004) from the particular interventionist device, by the service controller (2001), a test response to the transmitted test request; and based on the test response, generating (2006), by the service controller (2001), a performance metric of the human interventionist. The method of FIG. 21 also includes based on the performance metrics of the human interventionists of the plurality of human interventionists, determining (2008), by the service controller (2001), a rating for each human interventionist of the plurality of human interventionists.

In addition, the method of FIG. 21 also includes receiving (2102), by the service controller (2001), a request from an autonomous device. A request may be a message from the autonomous device that specifies information regarding the autonomous device. Examples of the types of information that the request may include but are not limited to: an operational status of the autonomous device (e.g., on/off; stuck message; error message; alarm codes/messages; damaged equipment; etc.), an instruction/routine/process indication (e.g., right movement loop), a last step/operation/task/behavior performed (e.g., turned left; shutdown rotor), a plurality of decision choices (e.g., menu choices—identify objects as (a), (b), or (c)), a type of behavior/task that is required to perform (e.g., provide coordinates; guide robot movement), urgency indication (e.g. respond to five minutes), criteria for selecting a human interventionist (e.g., need a doctor; need a mechanic; need a level 8 technician; need lowest cost, available technician that can do level 7 operation on robot); and others as will occur to those of skill in the art after reading the subject disclosure. Receiving (2102), by the service controller (301), a request from an autonomous device may be carried out by receiving via wired or wireless communication, a message from the autonomous device.

The method of FIG. 21 also includes selecting (2104) from the plurality of human interventionists, by the service controller (2001), a first set of human interventionists to respond to the request. Selecting (2104) from the plurality of human interventionists, by the service controller (2001), a first set of human interventionists to respond to the request may be carried out by identifying a set of human interventionists that best satisfy the selection criteria that is specified by the service controller or the request.

The method of FIG. 21 also includes transmitting (2106), by the service controller (2001), the request to a first set of interventionist devices, each interventionist device of the first set of interventionist devices associated with a particular human interventionist in the first set of human interventionists. Transmitting (2106), by the service controller (2001), the request to a first set of interventionist devices may be carried out by modifying the request by reformatting, adding data, or removing data from the request; and sending the response via a wireless or wired communication network or connection to the interventionist device. For example, the request may be transmitted via an API, as an email, a text message, a link to a network location, and any other electronic means of relaying information from one device to another device.

The method of FIG. 21 also includes receiving (2108) from the first set of interventionist devices, by the service controller (2001), a first set of interventionist responses to the request. Receiving (2108) from the first set of interventionist devices, by the service controller (2001), a first set of interventionist responses to the request may be carried out by receiving data via a wireless or wired communication network or connection to the interventionist device.

For further explanation, FIG. 22 sets forth a flow chart illustrating an exemplary method for facilitating human intervention in an autonomous device according to embodiments of the present disclosure. The method of FIG. 22 includes placing (2202), by an autonomous device (2201), an object in a stack of one or more objects. Placing (2202), by an autonomous device (2201), an object in a stack of one or more objects may be carried out by using an autonomous process to identify an object to move, determining how to grasp the object, grasping the object using one or components of the autonomous device, identifying a location to place the object, moving the object to the location, and releasing the object.

The method of FIG. 22 also includes in response to placing the object in the stack, detecting (2204), by the autonomous device (2201), instability in the stack. Detecting (2204), by the autonomous device (2201), instability in the stack in response to placing the object in the stack may be carried out by receiving sensor input associated with the object; analyzing the sensor input; comparing the sensor input to historical records, and determining, based on the analysis of the sensor input, that the object or stack is unstable. For example, the autonomous device may determine from pictures of the stack that one or more objects in the stack forms a configuration that historically has shown to be unstable.

In addition, the method of FIG. 22 also includes determining (2206), by the autonomous device (2201), that correcting the instability requires a level of capability beyond a threshold associated with the autonomous device. Determining (2206), by the autonomous device (2201), that correcting the instability requires a level of capability beyond a threshold associated with the autonomous device may be carried out by analyzing a historical record to determine whether the identified unstable configuration has successfully been stabilized by the autonomous device. For example, the autonomous device may determine that the autonomous device has previously attempted unsuccessfully to stabilize this type of stacked configuration.

The method of FIG. 22 also includes in response to determining that correcting the instability requires the level of capability beyond the threshold associated with the autonomous device, generating (2208), by the autonomous device (2201), a request for human intervention. Generating (2208), by the autonomous device (2201), a request for human intervention in response to determining that correcting the instability requires the level of capability beyond the threshold associated with the autonomous device may be carried out by transmitting to a service controller, a message requesting human intervention in stabilizing the stack.

For further explanation, FIG. 23 sets forth a flow chart illustrating an exemplary method for facilitating human intervention in an autonomous device according to embodiments of the present disclosure. The method of FIG. 23 includes grasping (2302), by an autonomous device (2301), an object with one or more components of the autonomous device. Grasping (2302), by an autonomous device (2301), an object with one or more components of the autonomous device may be carried out by identify an object to move, determining how to grasp the object, and grasping the object using one or components of the autonomous device.

The method of FIG. 23 also includes based on sensor input, determining (2304), by the autonomous device (2301), a level of confidence that the object is securely grasped with the one or more components of the autonomous device (2301). Determining (2304) based on sensor input, by the autonomous device (2301), a level of confidence that the object is securely grasped with the one or more components of the autonomous device (2301) may be carried out by receiving sensor input (e.g., tactile sensors, pressure sensors, camera input, etc.) associated with the object and the components of the autonomous device; analyzing the sensor input; comparing the sensor input to historical records; and determining, based on the analysis of the sensor input, that the object is not securely grasped.

In addition, the method of FIG. 23 also includes determining (2306), by the autonomous device (2301), that the level does not satisfy a confidence requirement. Determining (2306), by the autonomous device (2301), that the level does not satisfy a confidence requirement may be carried out by determining based on the sensor input that the object has a particular probability of coming loose from the grasp of the autonomous device.

The method of FIG. 23 also includes in response to determining that the level does not satisfy the confidence requirement, generating (2308), by the autonomous device (2301), a request for human intervention. Generating (2308), by the autonomous device (2301), a request for human intervention in response to determining that the level does not satisfy the confidence requirement may be carried out by determining that the probability of the object coming loose exceeds a threshold associated with the confidence requirement.

For further explanation, FIG. 24 sets forth a flow chart illustrating an exemplary method for facilitating human intervention in an autonomous device according to embodiments of the present disclosure. The method of FIG. 24 includes receiving (2402), by a service controller (2401), a request from an autonomous device. Receiving (2402), by a service controller (2401), a request from an autonomous device may be carried out by receiving via a wireless or wired connection, a message that specifies information regarding the autonomous device. Examples of the types of information that the request may include but are not limited to: an operational status of the autonomous device (e.g., on/off; stuck message; error message; alarm codes/messages; damaged equipment; etc.), an instruction/routine/process indication (e.g., right movement loop), a last step/operation/task/behavior performed (e.g., turned left; shutdown rotor), a plurality of decision choices (e.g., menu choices—identify objects as (a), (b), or (c)), a type of behavior/task that is required to perform (e.g., provide coordinates; guide robot movement), urgency indication (e.g. respond to five minutes), criteria for selecting a human interventionist (e.g., need a doctor; need a mechanic; need a level 8 technician; need lowest cost, available technician that can do level 7 operation on robot); and others as will occur to those of skill in the art after reading the subject disclosure.

The method of FIG. 24 also includes generating (2404), by the service controller (2401), a service response to the request, the service response generated based on least one of: a first set of interventionist responses received from a first set of interventionist devices associated with a first set of human interventionists; and a first set of autonomous responses generated by an autonomous module. In a particular embodiment, the service controller may have an autonomous module that is capable of generating a set of autonomous responses (e.g., one or more responses). The service controller may also send a request to one or more human interventionist devices and receive interventionist responses. Generating (2404), by the service controller (2401), a service response to the request, the service response generated based on least one of: a first set of interventionist responses received from a first set of interventionist devices associated with a first set of human interventionists; and a first set of autonomous responses generated by an autonomous module may be carried out by using one or more of the first set of autonomous responses and the first set of interventionist responses to create the service response, averaging the responses, and modifying the responses by reformatting, adding data, or removing data from the responses.

In addition, the method of FIG. 24 also includes training (2406), by the service controller (2401), the autonomous module using at least one of the first set of interventionist responses and the first set of autonomous responses. Training (2406), by the service controller (2401), the autonomous module using at least one of the first set of interventionist responses and the first set of autonomous responses may be carried out by determining the most common response among the responses (autonomous responses and interventionist responses); using the determined most common response as the response that the autonomous module should provide in response to receiving a similar request. In a particular embodiment, the service controller may determine the outcome of the service response to determine whether the service response is used as the response that the autonomous module should provide in response to receiving a similar response. In another embodiment, the service controller may utilize feedback from the autonomous device to determine whether the service response is used as the response that the autonomous module should provide in response to receiving a similar response.

Figure 25:
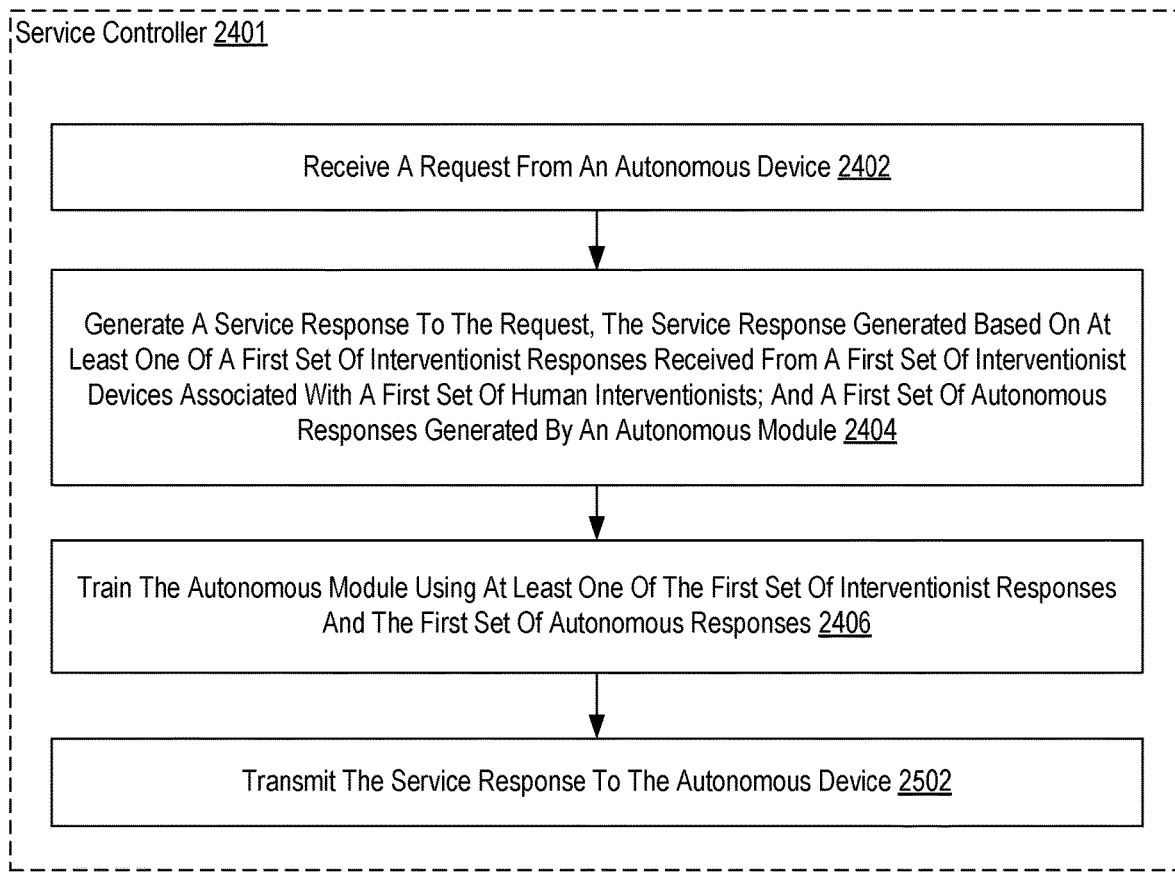
FIG. 25 sets forth a flowchart of another example method for facilitating human intervention in an autonomous device according to embodiments of the present disclosure.

For further explanation, FIG. 25 sets forth a flow chart illustrating an exemplary method for facilitating human intervention in an autonomous device according to embodiments of the present disclosure. The method of FIG. 25 is similar to the method of FIG. 24 in that the method of FIG. 25 also includes receiving (2402), by a service controller (2401), a request from an autonomous device; generating (2404), by the service controller (2401), a service response to the request, the service response generated based on least one of: a first set of interventionist responses received from a first set of interventionist devices associated with a first set of human interventionists; and a first set of autonomous responses generated by an autonomous module; and training (2406), by the service controller (2401), the autonomous module using at least one of the first set of interventionist responses and the first set of autonomous responses.

However, unlike the method of FIG. 24, the method of FIG. 25 includes transmitting (2502), by the service controller (2401), the service response to the autonomous device. Transmitting (2502), by the service controller (2401), the service response to the autonomous device may be carried out by sending the response via a wireless or wired communication network or connection to the autonomous device.

Exemplary embodiments of the present invention are described largely in the context of a fully functional computer system for facilitating human intervention in an autonomous device. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Hardware logic, including programmable logic for use with a programmable logic device (PLD) implementing all or part of the functionality previously described herein, may be designed using traditional manual methods or may be designed, captured, simulated, or documented electronically using various tools, such as Computer Aided Design (CAD) programs, a hardware description language (e.g., VHDL or Verilog), or a PLD programming language. Hardware logic may also be generated by a non-transitory computer readable medium storing instructions that, when executed by a processor, manage parameters of a semiconductor component, a cell, a library of components, or a library of cells in electronic design automation (EDA) software to generate a manufacturable design for an integrated circuit. In implementation, the various components described herein might be implemented as discrete components or the functions and features described can be shared in part or in total among one or more components. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present disclosure is limited only by the language of the following claims.

What is claimed is:

1. An apparatus for facilitating human intervention in an autonomous robotic device, the apparatus comprising a computer processor coupled to a computer readable storage medium that includes computer program instructions that when executed by the computer processor cause the apparatus to carry out the operations of:
   selecting from a first plurality of human interventionists, by a service controller, a first set of human interventionists to respond to a request associated with an autonomous robotic device, wherein the first set of human interventionists includes multiple human interventionists;
   transmitting, by the service controller, the request to a first set of interventionist devices, each interventionist device of the first set of interventionist devices associated with a particular human interventionist in the first set of human interventionists;
   receiving from the first set of interventionist devices, by the service controller, a first set of interventionist responses to the request, wherein the first set of interventionist responses includes multiple interventionist responses corresponding to multiple human interventionists;
   determining, by the service controller, whether the service controller is sufficiently confident in the received first set of interventionist responses;
   in response to determining that the service controller is sufficiently confident in the received first set of interventionist responses:
      based on the first set of interventionist responses, generating, by the service controller, a service response to the request, the service response including data formatted to instruct the autonomous robotic device to perform an action; and
      transmitting, by the service controller, the service response to the autonomous robotic device; and
   in response to determining that the service controller is not sufficiently confident in the first set of interventionist responses:
      selecting from a second plurality of human interventionists, by the service controller, a second set of human interventionists to respond to the request, wherein the second set of human interventionists includes multiple human interventionists;
      transmitting, by the service controller, the request to a second set of interventionist devices, each interventionist device of the second set of interventionist devices associated with a particular human interventionist in the second set of human interventionists; and
      receiving, by the service controller, a second set of interventionist responses from the second set of interventionist devices, wherein the second set of interventionist responses includes multiple interventionist responses corresponding to multiple human interventionists.

2. The apparatus of claim 1 further comprising: computer program instructions that when executed by the computer processor cause the apparatus to carry out the operations of:
   determining, by the service controller, whether the service controller is sufficiently confident in an aggregate of the received first set of interventionist responses and the received second set of interventionist responses;
   in response to determining that the service controller is sufficiently confident in the aggregate of the first set of interventionist responses and the second set of interventionist responses:
      based on the aggregate of the first set of interventionist responses and the second set of interventionist responses, generating, by the service controller, a service response to the request; and
      transmitting, by the service controller, the service response to the autonomous robotic device; and
   in response to determining that the service controller is not sufficiently confident in the aggregate of the first set of interventionist responses and the second set of interventionist responses:
      selecting from a third plurality of human interventionists, by the service controller, a third set of human interventionists to respond to the request, wherein the third set of human interventionists includes multiple human interventionists;
      transmitting, by the service controller, the request to a third set of interventionist devices, each interventionist device of the third set of interventionist devices associated with a particular human interventionist in the third set of human interventionists; and
      receiving, by the service controller, a third set of interventionist responses from the third set of interventionist devices.

3. The apparatus of claim 1 further comprises: computer program instructions that when executed by the computer processor cause the apparatus to carry out the operations of:

determining, by the service controller, whether the service controller can perform the request autonomously; and
  wherein selecting from the first plurality of human interventionists, by the service controller, the first set of human interventionists to respond to the request is in response to determining that the service controller cannot perform the request autonomously;
  wherein transmitting, by the service controller, the request to the first set of interventionist devices is in response to determining that the service controller cannot perform the request autonomously; and
  wherein receiving from the first set of interventionist devices, by the service controller, the first set of interventionist responses to the request is in response to determining that the service controller cannot perform the request autonomously.

4. The apparatus of claim 3 further comprising computer program instructions that when executed by the computer processor cause the apparatus to carry out the operations of:
  in response to determining that the service controller can perform the request autonomously, generating, by the service controller, an autonomous response.

5. The apparatus of claim 4 further comprising computer program instructions that when executed by the computer processor cause the apparatus to carry out the operations of:
  based on the autonomous response, generating, by the service controller, a service response to the request; and
  transmitting, by the service controller, the service response to the autonomous robotic device.

6. The apparatus of claim 1 further comprising computer program instructions that when executed by the computer processor cause the apparatus to carry out the operations of:
  determining, by the service controller, whether the service controller can perform the request autonomously;
  in response to determining that the service controller can perform the request autonomously, generating, by the service controller, an autonomous response, determining, by the service controller, whether the service controller is sufficiently confident in the autonomous response;
  in response to determining that the service controller is sufficiently confident in the autonomous response:
    based on the autonomous response, generating, by the service controller, a service response to the request; and
    transmitting, by the service controller, the service response to the autonomous robotic device; and
  wherein selecting from the first plurality of human interventionists, by the service controller, the first set of human interventionists to respond to the request is in response to determining that that the service controller is not sufficiently confident in the autonomous response;
  wherein transmitting, by the service controller, the request to the first set of interventionist devices is in response to determining that that the service controller is not sufficiently confident in the autonomous response; and
  wherein receiving from the first set of interventionist devices, by the service controller, the first set of interventionist responses to the request is in response to determining that that the service controller is not sufficiently confident in the autonomous response.

7. The apparatus of claim 1, wherein selecting from the first plurality of human interventionists, by the service controller, the first set of human interventionists to respond to the request includes:
  determining, for the request, an expense range and selection criteria;
  for one or more human interventionists of the first plurality of human interventionists, determining an interventionist expense for each of the one or more human interventionists, the interventionist expense indicating a cost of using the human interventionist to respond to the request; and
  selecting, from the first plurality of human interventionists, the first set of human interventionists based on the expense range, the selection criteria, and the interventionist expense of each of the one or more human interventionists.

8. The apparatus of claim 1, wherein selecting from the first plurality of human interventionists, by the service controller, the first set of human interventionists to respond to the request includes:
  determining, for the request, a difficulty rating and selection criteria;
  for one or more human interventionists of the first plurality of human interventionists, determining a qualification rating of each of the one or more human interventionists; and
  selecting, from the first plurality of human interventionists, the first set of human interventionists based on the difficulty rating, the selection criteria, and the qualification rating of each of the one or more human interventionists.

9. The apparatus of claim 1 wherein selecting from the first plurality of human interventionists, by the service controller, the first set of human interventionists to respond to the request includes:
  for one or more human interventionists of the first plurality of human interventionists, determining a responsiveness of each of the one or more human interventionists;
  determining, for the request, an urgency rating and selection criteria; and
  selecting, from the first plurality of human interventionists, the first set of human interventionists based on the urgency rating, the selection criteria, and the responsiveness of each of the one or more human interventionists.

10. The apparatus of claim 1 wherein selecting from the first plurality of human interventionists, by the service controller, the first set of human interventionists to respond to the request includes:
  for one or more human interventionists of the first plurality of human interventionists, determining, by the service controller, a performance metric of each of the one or more human interventionists;
  determining, for the request, a performance requirement and selection criteria; and
  selecting, from the first plurality of human interventionists, the first set of human interventionists based on the performance requirement, the selection criteria, and the performance metric of each of the one or more human interventionists.

11. The apparatus of claim 1 wherein selecting from the first plurality of human interventionists, by the service controller, the first set of human interventionists to respond to the request includes:
  determining, by the service controller, a confidence requirement associated with the request;
  determining a number of human interventionists needed to satisfy the confidence requirement; and including at least the determined number of human interventionists within the first set of human interventionists.

12. The apparatus of claim 1 wherein selecting from the first plurality of human interventionists, by the service controller, the first set of human interventionists to respond to the request includes:
   determining a type of task to be performed, by a human interventionist, for responding to the request;
   determining a type of interventionist device for performing the task; and
   selecting for the first set of human interventionists, a particular human interventionist having a particular interventionist device matching the determined type of interventionist device.

13. The apparatus of claim 1 wherein selecting from the first plurality of human interventionists, by the service controller, the first set of human interventionists to respond to the request includes:
   determining a type of task to be performed by a human interventionist, for responding the request; and
   selecting for the first set of human interventionists, a particular human interventionist having a profile indicating a capability of performing the type of task to be performed for responding to the request.

14. The apparatus of claim 1 wherein each human interventionist in the first set of human interventionists has an associated expense for performing a particular type of request; the apparatus further comprising computer program instructions that when executed by the computer processor cause the apparatus to carry out the operations of:
   attributing to an account associated with the autonomous robotic device, by the service controller, the particular expense associated with each human interventionist in the first set of human interventionists.

15. The apparatus of claim 1 further comprising computer program instructions that when executed by the computer processor cause the apparatus to carry out the operations of:
   for one or more human interventionists in the first plurality of human interventionists:
      transmitting, by the service controller, a test request to a particular interventionist device associated with a particular human interventionist;
      receiving from the particular interventionist device, by the service controller, a test response to the transmitted test request; and
      based on the test response, generating, by the service controller, a performance metric of the human interventionist; and
   based on the performance metric of each of the one or more human interventionists of the first plurality of human interventionists, determining, by the service controller, a rating for each of the one or more human interventionists; and
   wherein selecting from the first plurality of human interventionists, by the service controller, the first set of human interventionists to respond to the request includes selecting, based on the determined ratings, the first set of human interventionists.

16. The apparatus of claim 15, wherein based on the test response, generating, by the service controller, the performance metric of the human interventionist includes:
   transmitting the test response to a human interventionist evaluator; and
   receiving from the human interventionist evaluator, an evaluation of the test response.

17. The apparatus of claim 1 wherein selecting from the first plurality of human interventionists, by the service controller, the first set of human interventionists to respond to the request includes:
   determining, by the service controller, whether a particular human interventionist is available;
   in response to determining that the particular human interventionist is not available, excluding, by the service controller, the particular human interventionist from the first set of human interventionists to respond to the request; and
   in response to determining that the particular human interventionist is available, adding, by the service controller, the particular human interventionist to the first set of human interventionists to respond to the request.

18. The apparatus of claim 1, wherein determining, by the service controller, whether the service controller is sufficiently confident in the received first set of interventionist responses includes:
   determining a most common response among the first set of interventionist responses;
   determining a confidence rating for the most common response based at least on a number of instances of the most common response in the first set of interventionist responses; and
   comparing the confidence rating to a threshold.

19. A computer program product for facilitating human intervention in an autonomous robotic device, the computer program product including a computer readable medium having computer program instructions that when executed by a computer processor cause the computer processor to perform:
   for each human interventionist of a plurality of human interventionists:
      transmitting, by a service controller, a test request to a particular interventionist device associated with a particular human interventionist wherein the test request includes a sample request;
      receiving from the particular interventionist device, by the service controller, a test response to the transmitted test request, wherein the test response is indicative of a decision made by the particular human interventionist based on the sample request; and
      based on the test response, generating, by the service controller, a performance metric of the human interventionist; and
   based on the performance metrics of the human interventionists of the plurality of human interventionists, determining, by the service controller, a rating for each human interventionist of the plurality of human interventionists including comparing the decision to a predetermined solution of the sample request.

20. The computer program product of claim 19 further comprising computer program instructions that when executed by the computer processor cause the computer processor to perform:
   receiving, by the service controller, a request from an autonomous robotic device;
   selecting from the plurality of human interventionists, by the service controller, a first set of human interventionists to respond to the request;
   transmitting, by the service controller, the request to a first set of interventionist devices, each interventionist device of the first set of interventionist devices associated with a particular human interventionist in the first set of human interventionists; and receiving from the first set of interventionist devices, by the service controller, a first set of interventionist responses to the request, wherein the first set of interventionist responses includes multiple interventionist responses corresponding to multiple human interventionists in the first set of human interventionists.

\* \* \* \* \*